(12) United States Patent
Tanabe

(10) Patent No.: US 7,682,522 B2
(45) Date of Patent: Mar. 23, 2010

(54) POLYMERIZABLE MENTHOL DERIVATIVE

(75) Inventor: Mayumi Tanabe, Ichihara (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 0 days.

(21) Appl. No.: 12/266,744

(22) Filed: Nov. 7, 2008

(65) Prior Publication Data

US 2009/0121187 A1    May 14, 2009

(30) Foreign Application Priority Data

Nov. 14, 2007    (JP)    ............... 2007-295386

(51) Int. Cl.
| C09K 19/20 | (2006.01) |
| C09K 19/30 | (2006.01) |
| C09K 19/32 | (2006.01) |
| C09K 19/38 | (2006.01) |
| C07C 69/76 | (2006.01) |
| C07C 69/82 | (2006.01) |

(52) U.S. Cl. .................... 252/299.63; 252/299.62; 252/299.64; 252/299.65; 252/299.67; 560/8; 560/100; 560/113; 560/183; 560/187; 428/1.1

(58) Field of Classification Search ............ 252/299.62, 252/299.64, 299.65, 299.67, 299.61; 560/8, 560/100, 183, 187, 113; 428/1.1
See application file for complete search history.

(56) References Cited

U.S. PATENT DOCUMENTS

| 5,187,248 A | 2/1993 | Etzbach et al. |
| 5,187,298 A | 2/1993 | Etzbach et al. |
| 5,212,027 A | 5/1993 | Etzbach et al. |

FOREIGN PATENT DOCUMENTS

| EP | 0399279 | 11/1990 |
| JP | 2005-015473 | 1/2005 |
| WO | 96/17901 | 6/1996 |
| WO | 2004/090024 | 10/2004 |

OTHER PUBLICATIONS

Article Titled "Photochemical tuning capability of cholesteric liquid crystal cells containing chiral dopants end capped with methyl groups" jointly authored by Liu et al., in Liquid Crystals, vol. 34, No. 7, Jul. 1, 2007 (pp. 891-902).

*Primary Examiner*—Shean C Wu
(74) *Attorney, Agent, or Firm*—J.C. Patents

(57) ABSTRACT

The invention includes compounds represented by Formula (1):

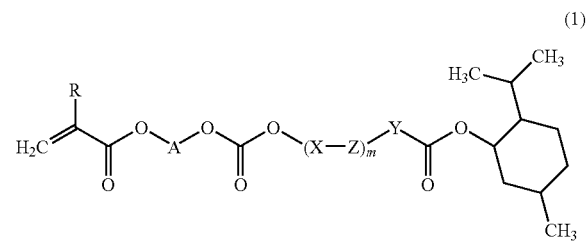

wherein R represents hydrogen or methyl; A represents alkylene having from 1 to 12 carbon atoms, wherein in the alkylene, arbitrary —$CH_2$— may be replaced by —O—, —S—, —CH=CH—, —CO—, —COO— or —OCO—; X and Y each independently represent an aromatic ring or a cyclohexane ring, wherein in the rings, arbitrary hydrogen may be replaced by alkyl having from 1 to 3 carbon atoms; Z independently represents a single bond, —O—, —S—, —COO—, —OCO—, —CON($R^1$)— or —N($R^1$)CO—, wherein $R^1$ represents hydrogen or methyl; and m represents an integer of from 0 to 3.

19 Claims, No Drawings

POLYMERIZABLE MENTHOL DERIVATIVE

CROSS-REFERENCE TO RELATED APPLICATION

This application claims the priority benefit of Japan application serial no. 2007-295386, filed Nov. 14, 2007. The entirety of the above-mentioned patent application is hereby incorporated by reference herein and made a part of specification.

BACKGROUND OF THE INVENTION

1. Field of the Invention

The present invention relates to a novel menthol derivative. More specifically, the invention relates to a polymerizable menthol derivative, which is an optically active compound capable of being used as a chiral agent, a liquid crystal composition containing the menthol derivative, a polymer obtained from the composition, and use of them.

2. Description of the Related Art

A cholesteric liquid crystal molecule has a helical structure in its liquid crystal state. Accordingly, when a cholesteric liquid crystal having a helical structure having been fixed by polymerization is irradiated with light, it reflects circularly polarized light having a wavelength range that corresponds to the direction in rotation direction and the length of the pitch of the helix of the liquid crystal molecule. For example, when the cholesteric liquid crystal is irradiated with visible light, it selectively reflects light with wavelengths of blue, green, yellow and red corresponding to the length of the pitch of the liquid crystal. The color tone is different from that of a pigment or a dye, which shows color by absorption of light, and has viewing angle dependency, in which the color tone varies depending on the viewing angle. The length of the pitch of the cholesteric liquid crystal can be controlled by the temperature and the species of the compound, and thus the cholesteric liquid crystal can selectively reflect not only visible light but also light in the near infrared range or an ultraviolet range.

Such a material has been provided that selectively reflects light having a wavelength varying within a wide range by utilizing the characteristics of the cholesteric liquid crystal. Examples of the applications thereof include a liquid crystal pigment, a paint, a spray ink, a printing ink, a cosmetic product, an anticounterfeit printed matter and an ornamental article. Such applications have been proposed as an optical film for a polarizing plate, a compensation plate, a color filter and the like having an optical device such as a liquid crystal display device and a holography device. The cholesteric liquid crystal pigment as a known material is used as a cholesteric liquid crystal polymer in a flake form and a cholesteric liquid crystal in a form of microcapsules. Examples of the applications of the cholesteric liquid crystal pigment include a paint for automobiles and a cosmetic product.

A cholesteric liquid crystal can be generally prepared by adding an optically active compound (chiral agent) to a nematic liquid crystal. For reflecting circularly polarized light having a wavelength of from the ultraviolet range to the visible range, the cholesteric liquid crystal necessarily has a helical structure having an extremely short pitch. For attaining the helical structure having an extremely short pitch, an optically active compound having a large helical twisting power is demanded. When an optically active compound having a small HTP, the addition amount thereof is necessarily increased, which provides difficulty in control of the other properties, such as the temperature, at which a cholesteric liquid crystal appears, and the selected reflection wavelength range. In many cases, furthermore, an optically active compound does not exhibit liquid crystallinity, and when its addition amount is increased, the composition loses liquid crystallinity to fail to provide the intended cholesteric liquid crystal phase.

An optically active compound having a large HTP with a complex structure may require a laborious production process and thus may be an expensive material, which is not suitable for a mass-produced material in industrial scale.

JP-T-10-509726 and JP-A-3-72445 disclose polymerizable menthol derivatives, but there is a demand for development of a novel polymerizable menthol derivative.

SUMMARY OF THE INVENTION

The invention relates to a compound represented by formula (1):

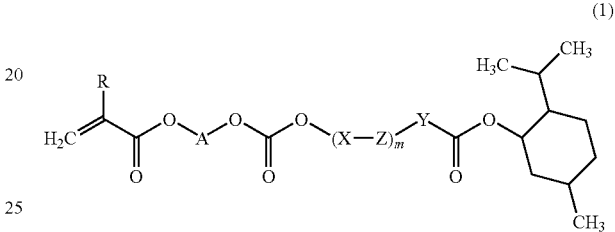

wherein

R represents hydrogen or methyl;

A represents alkylene having from 1 to 12 carbon atoms, wherein in the alkylene, arbitrary —CH$_2$— may be replaced by —O—, —S—, —CH=CH—, —CO—, —COO— or —OCO—;

X and Y each independently represent an aromatic ring or a cyclohexane ring, wherein in the rings, arbitrary hydrogen may be replaced by alkyl having from 1 to 3 carbon atoms;

Z independently represents a single bond, —O—, —S—, —COO—, —OCO—, —CON(R$^1$)— or —N(R$^1$)CO—, wherein R$^1$ represents hydrogen or methyl; and m represents an integer of from 0 to 3.

The invention includes the following embodiments.

DETAILED DESCRIPTION OF THE INVENTION

It has been found that the novel polymerizable optically active compound of the invention has a large HTP, is excellent in compatibility with other liquid crystal compounds, can be easily controlled in characteristics required as a cholesteric material, and can be produced by an economically advantageous process that is suitable for a mass-produced material in industrial scale. The term liquid crystal material referred herein is a generic term including a liquid crystal compound and a liquid crystal composition. Specific embodiments of the invention will be described below.

[1] A compound represented by formula (1):

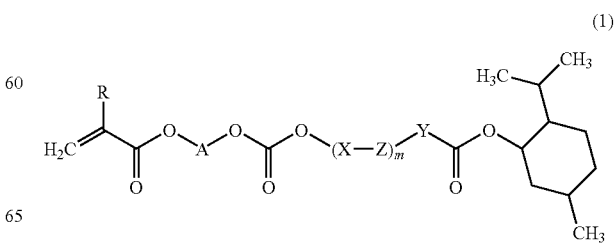

wherein

R represents hydrogen or methyl;

A represents alkylene having from 1 to 12 carbon atoms, wherein in the alkylene, arbitrary —CH$_2$— may be replaced by —O—, —S—, —CH=CH—, —CO—, —COO— or —OCO—;

X and Y each independently represent an aromatic ring or a cyclohexane ring, wherein in the rings, arbitrary hydrogen may be replaced by alkyl having from 1 to 3 carbon atoms;

Z independently represents a single bond, —O—, —S—, —COO—, —OCO—, —CON(R$^1$)— or —N(R$^1$)CO—, wherein R$^1$ represents hydrogen or methyl; and m represents an integer of from 0 to 3.

[2] The compound according to item [1], wherein in formula (1), —(X—Z)$_m$—Y— is a structure represented by formula (2-1) or (2-2):

(2-1)

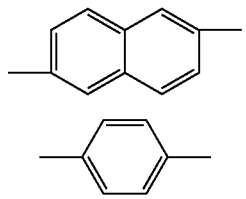

(2-2)

[3] The compound according to item [1], wherein in formula (1), —(X—Z)$_m$—Y— is a structure represented by one of formulae (3-1) to (3-7):

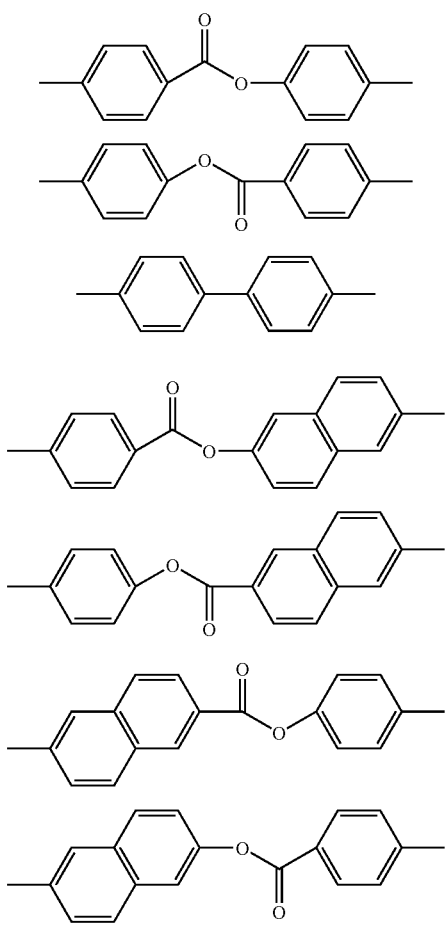

[4] The compound according to item [1], wherein in formula (1), —(X—Z)—Y— is a structure represented by one of formulae (4-1) to (4-4):

(4-1)

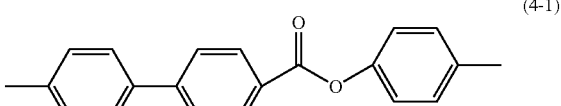

(4-2)

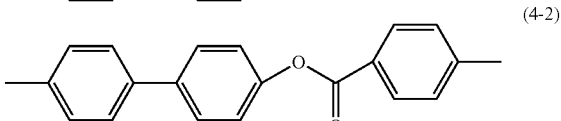

(4-3)

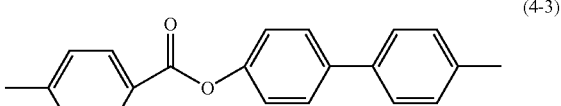

(4-4)

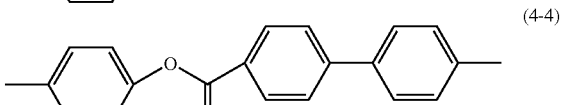

[5] The compound according to item [1], wherein in formula (1), A represents —CH$_2$CH$_2$CH$_2$CH$_2$— or —CH$_2$CH$_2$—.

[6] The compound according to item [1], wherein in formula (1), A represents —CH$_2$CH$_2$OCH$_2$CH$_2$— or —CH$_2$CH$_2$—O—CH$_2$CH$_2$—O—CH$_2$CH$_2$—.

[7] A liquid crystal composition comprising the compound according to one of items [1] to [6] and a liquid crystal compound.

[8] The liquid crystal composition according to item [7], wherein the liquid crystal composition comprises at least one polymerizable liquid crystal compound as the liquid crystal compound.

[9] A polymer comprising the liquid crystal composition according to item [8] having been polymerized.

[10] The polymer according to item [9], wherein the polymer exhibits a cholesteric liquid crystal phase.

[11] Use of the liquid crystal composition according to item [7] or [8] as a liquid crystal pigment, a paint, a spray ink, a printing ink, a cosmetic product, an anticounterfeit printed matter, an ornamental article and an optical film.

[12] Use of the polymer according to item [9] or [10] as a liquid crystal pigment, a paint, a spray ink, a printing ink, a cosmetic product, an anticounterfeit printed matter, an ornamental article and an optical film.

The compound of the invention has high polymerization reactivity, has a high HTP, is excellent in compatibility with other liquid crystal compounds, can be easily controlled in characteristics required as a cholesteric material, and can be produced by an economically advantageous process that is suitable for a mass-produced material in industrial scale, and therefore the compound can be favorably used as a chiral agent.

The compound of the invention and the use thereof will be described in detail below.

The compound represented by formula (1) may be referred to as a compound (1). In the case where a chemical formula includes plural X, arbitrary two groups or atoms represented by X may be the same as or different from each other. The rule is applied to the other symbols, such as Z.

Compound

The compound (1) of the invention has a polymerizable group at one end and a menthol residual group at the other end as shown in formula (1), and thus exhibits such characteristics as high polymerization reactivity, optical activity and good miscibility.

In formula (1), A represents alkylene having from 1 to 12 carbon atoms, wherein in the alkylene, arbitrary —$CH_2$— may be replaced by —O—, —S—, —CH=CH—, —CO—, —COO— or —OCO—.

Examples of the meaning of the language "in the alkylene, arbitrary —$CH_2$— may be replaced by —O—, —S—, —CH=CH—, —CO—, —COO— or —OCO—" will be shown. Examples of —$C_4H_8$—, in which arbitrary —$CH_2$— is replaced by —O— or —CH=CH—, include —$C_3H_6O$—, —$CH_2$—O—$(CH_2)_2$—, —$CH_2$—O—$CH_2$—O—, —HC=CH—$(CH_2)_3$—, —$CH_2$—CH=CH—$(CH_2)_2$— and —$CH_2$—CH=CH—$CH_2$—O—. Accordingly, the term "arbitrary" means "at least one selected without limitation". In consideration of safety of the compound, a group having plural oxygen atoms that are not adjacent to each other, such as —$CH_2$—O—$CH_2$—O—, is preferred rather than a group having plural oxygen atoms that are adjacent to each other, such as —$CH_2$—O—O—$CH_2$—.

Preferred examples of A include —$CH_2CH_2CH_2CH_2$—, —$CH_2CH_2$—, —$CH_2CH_2OCH_2CH_2$— and —$CH_2CH_2$—O—$CH_2CH_2$—O—$CH_2CH_2$—.

In formula (1), X and Y each independently represent an aromatic ring or a cyclohexane ring, wherein in the rings, arbitrary hydrogen may be replaced by alkyl having from 1 to 3 carbon atoms. Examples of X and Y include 1,4-cyclohexylene, 1,3-phenylene, 1,4-phenylene and naphthalene-2,6-diyl. Among these, 1,4-phenylene and naphthalene-2,6-diyl are preferred.

In formula (1), Z independently represents a single bond, —O—, —S—, —COO—, —OCO—, —CON($R^1$)— or —N($R^1$)CO— (wherein $R^1$ represents hydrogen or methyl), and among these, a single bond, —COO— and —OCO— are preferred.

In formula (1), m represents an integer of from 0 to 3, preferably an integer of from 0 to 2, and more preferably 0 or 1.

In formula (1), preferred examples of the moiety represented by —(X—Z)$_m$—Y— include (i) structures represented by formulae (2-1) and (2-2) where m=0, (ii) structures represented by formulae (3-1) to (3-7) where m=1, and (iii) structures represented by formulae (4-1) to (4-4) where m=2. In the case where the moiety represented by —(X—Z)$_m$—Y— is one of the structures (i), (ii) and (iii), such a compound can be provided that has a large HTP and is excellent in compatibility with other liquid crystal compounds.

Examples of the synthesis method of the compound (1) of the invention will be described.

(i) The compound (1) of the invention can be synthesized, for example, according to the following synthesis scheme.

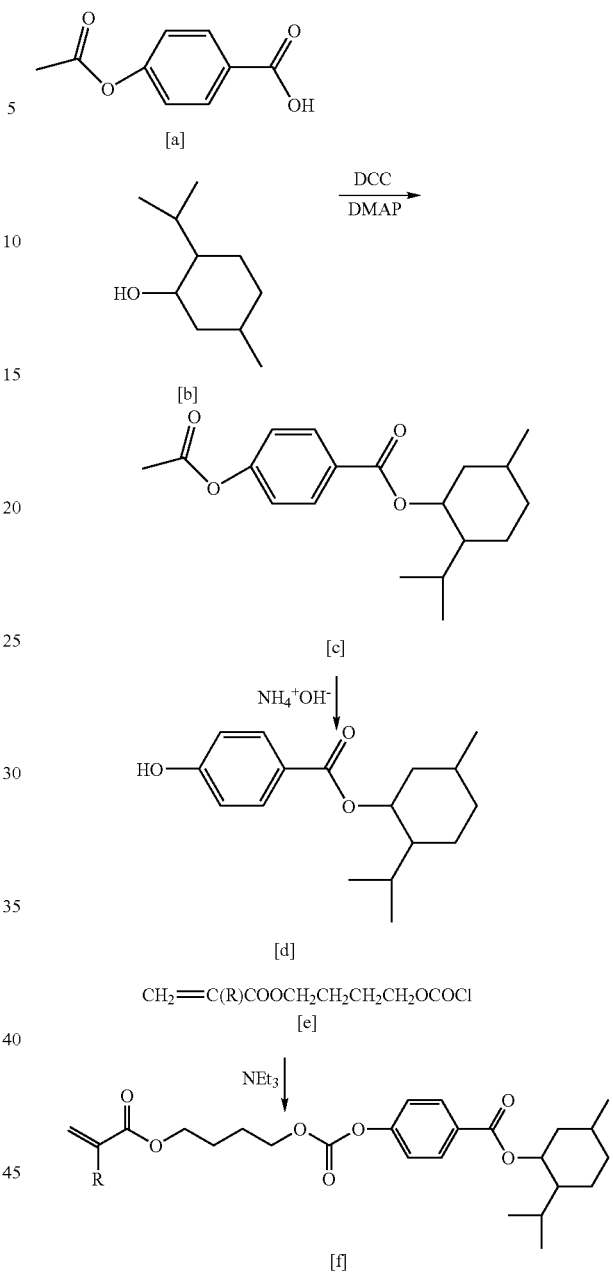

As shown in the scheme, acetoxybenzoic acid (a) and L-menthol (or d-menthol) are subjected to esterification reaction to synthesize a compound (c). A condensing agent, such as dicyclohexylcarbodiimide (DCC), may be preferably used for the esterification reaction. In the scheme, DMAP is an abbreviation of N,N-dimethyl-4-aminopyridine. The acetoxy group is deprotected under an alkali condition to provide a compound (d). The compound (d) and butanediol acrylate chloroformate (e) are subjected to esterification reaction to provide a compound (f). Instead of acetoxybenzoic acid (a), 6-hydroxy-2-naphthalene acid or 4'-hydroxy-4-biphenylcarboxylic acid, in which one of hydroxyl groups is protected with a protective group, such as an acetoxy group, may be used. Instead of 4-acryloyloxybutyl chloroformate (e), ethylene glycolmonoacrylate chloroformate, diethylene glycol acrylate chloroformate, triethylene glycol acrylate chloroformate and the like may be used.

(ii) The compound (1) of the invention can be synthesized, for example, according to the following synthesis scheme.

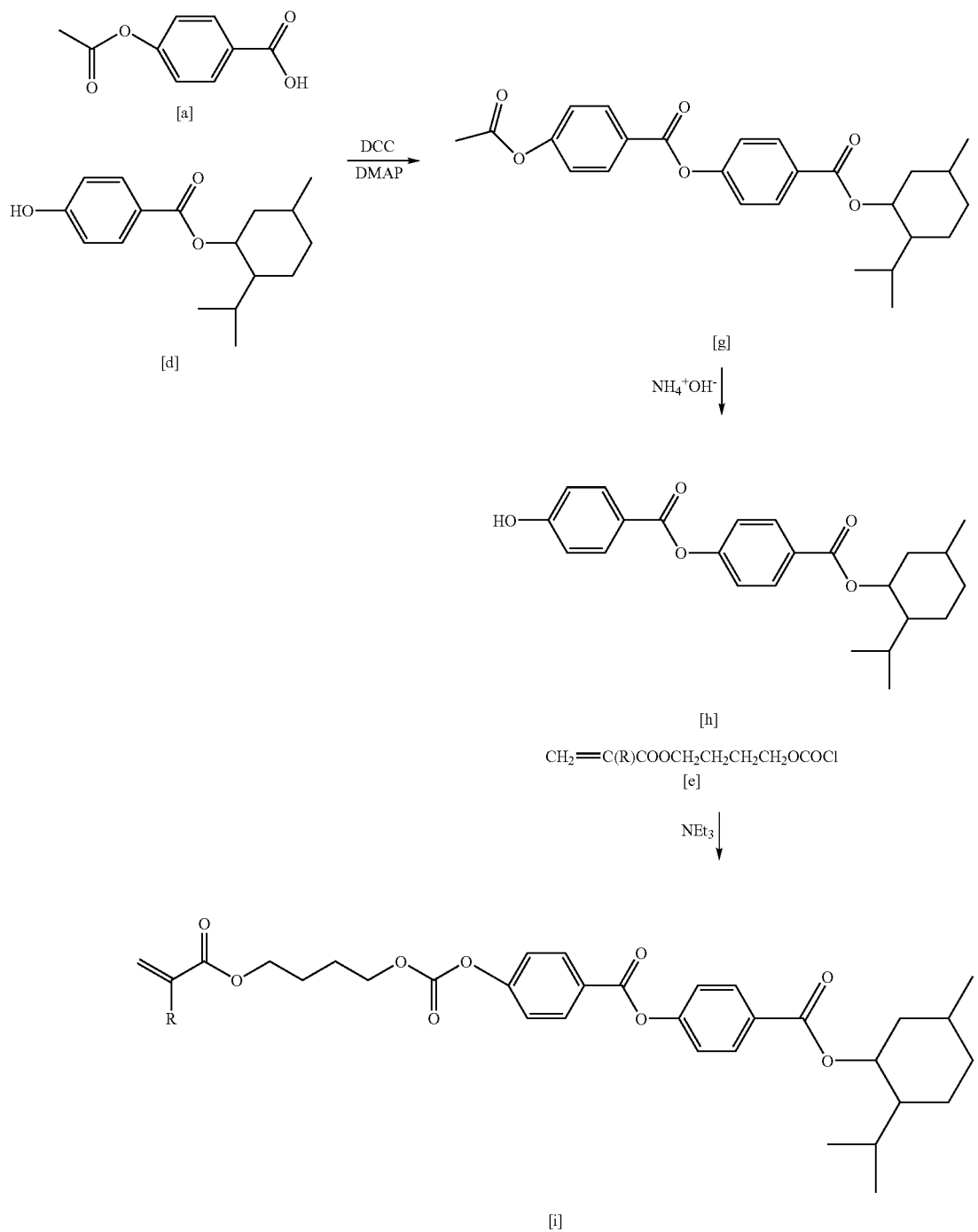

As shown in the scheme, the compound (d) obtained according to the scheme (i) and acetoxybenzoic acid (a) are subjected to esterification reaction to synthesize a compound (g). A condensing agent, such as dicyclohexylcarbodiimide (DCC), may be preferably used for the esterification reaction. The acetoxy group is deprotected under an alkali condition to provide a compound (h). The compound (h) and 4-acryloyloxybutyl chloroformate (e) are subjected to esterification reaction to provide a compound (i). Instead of acetoxybenzoic acid (a), 6-hydroxy-2-naphthalene acid or 4'-hydroxy-4-biphenylcarboxylic acid, in which one of hydroxyl groups is protected with a protective group, such as an acetoxy group, may be used. Instead of 4-acryloyloxybutyl chloroformate (e), ethylene glycolmonoacrylate chloroformate, diethylene glycol acrylate chloroformate, triethylene glycol acrylate chloroformate and the like may be used.

Specific examples of the compound (1) synthesized by the aforementioned manners are shown below. The structures of the compound (1) synthesized by the aforementioned manners can be confirmed, for example, by proton NMR spectrum.

(1)
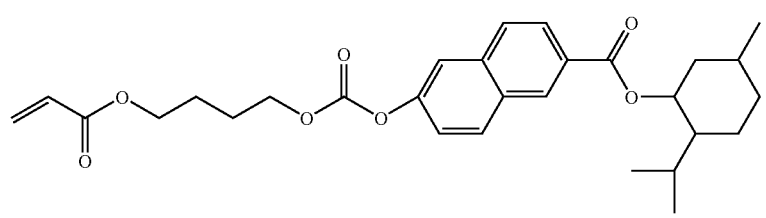
(2)
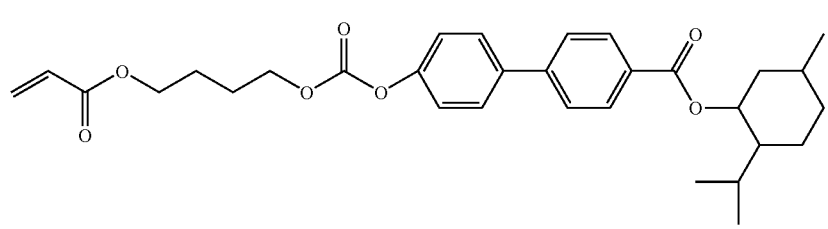
(3)
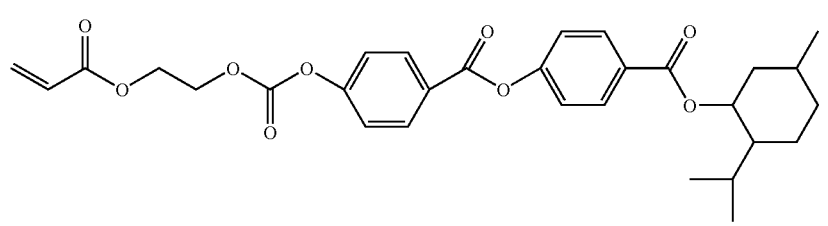
(4) (5)
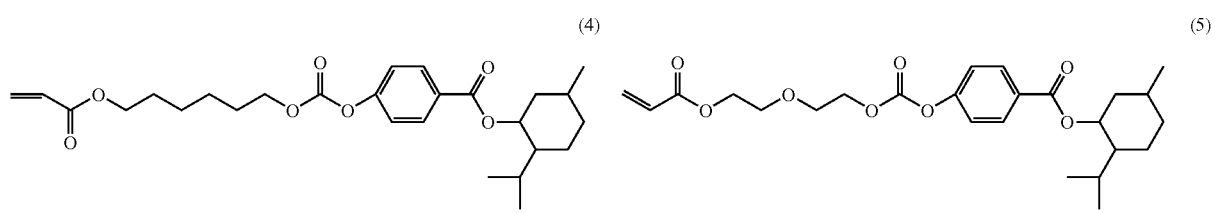
(6)
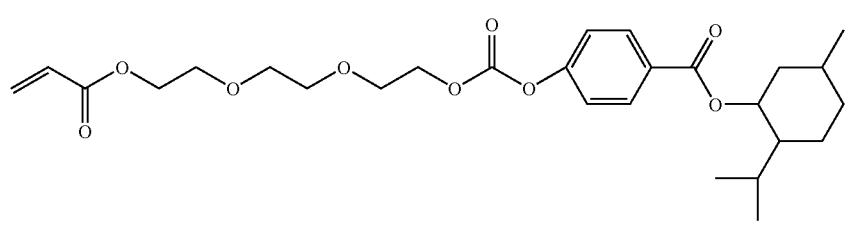
(7) (8)
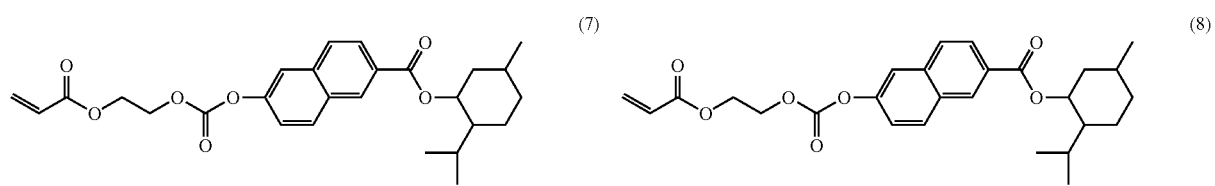
(9)
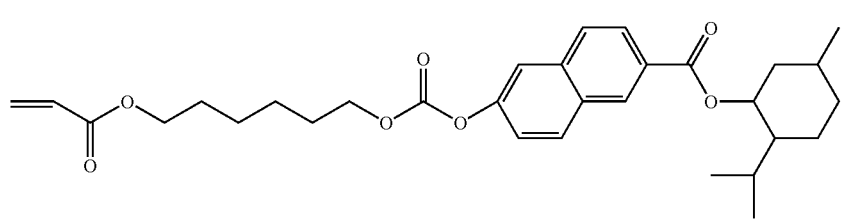

-continued
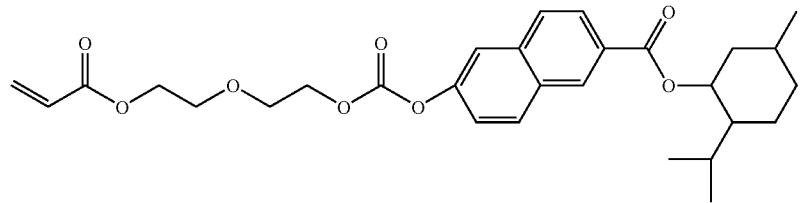
(10)
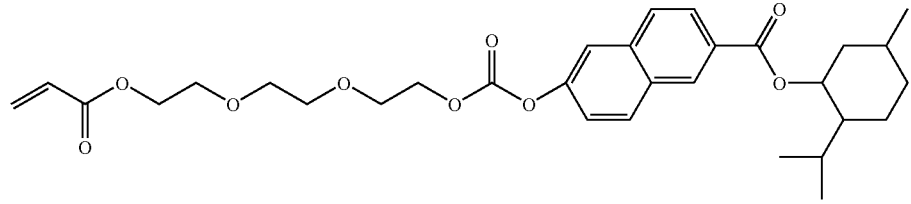
(11)
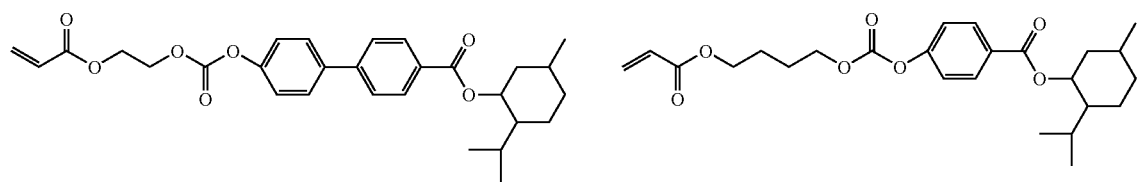
(12) (13)
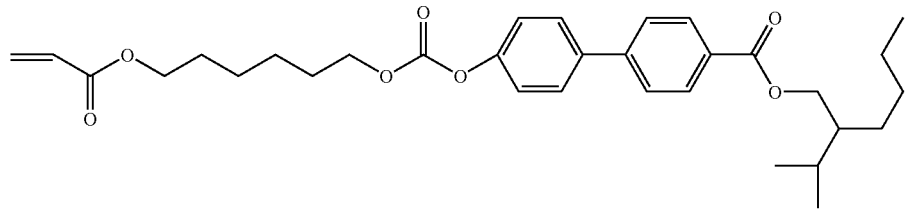
(14)
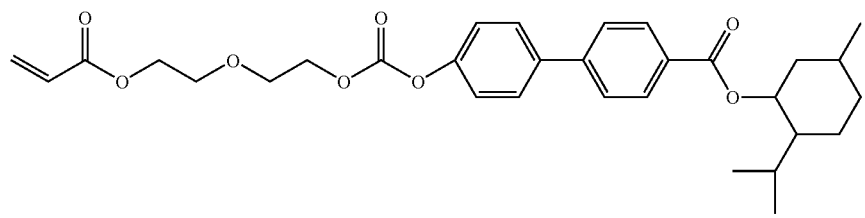
(15)
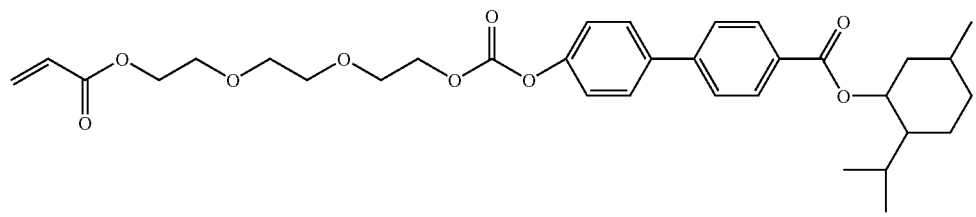
(16)
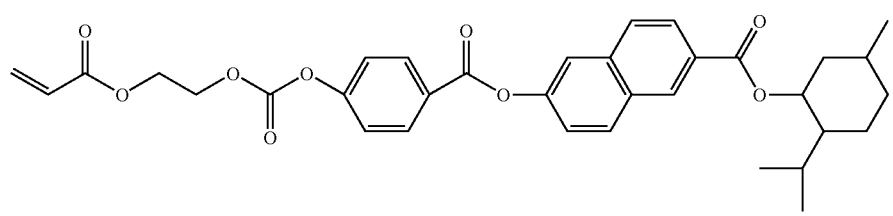
(17)

-continued
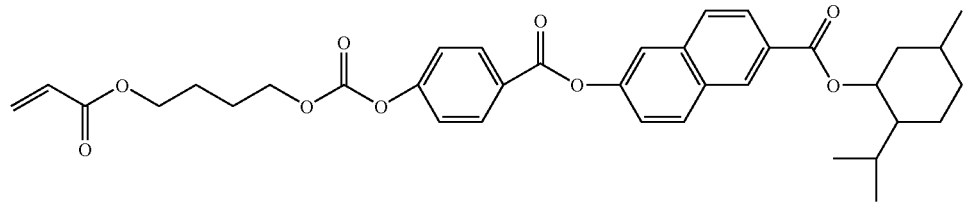
(18)
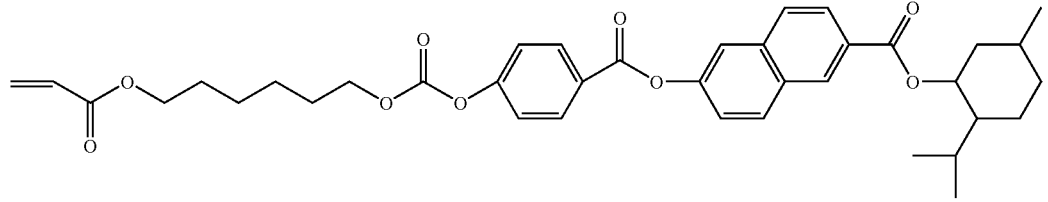
(19)
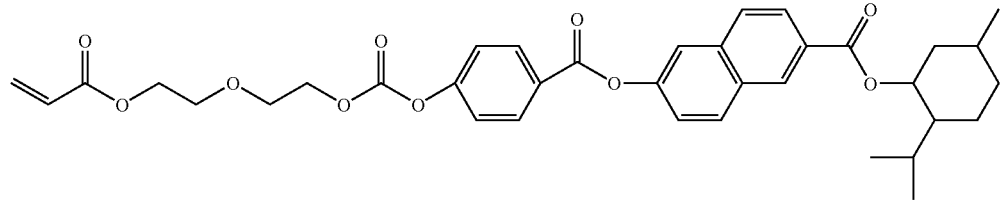
(20)
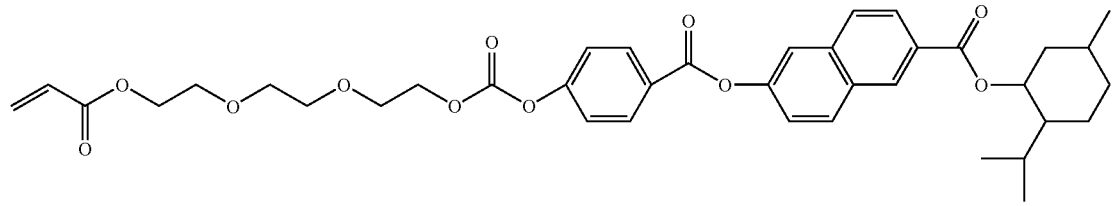
(21)
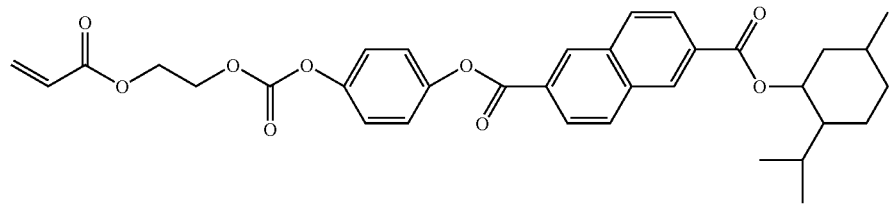
(22)
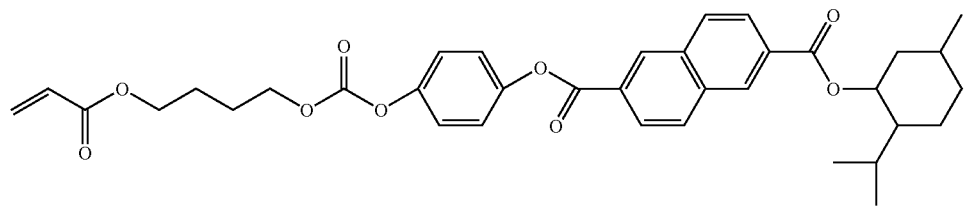
(23)
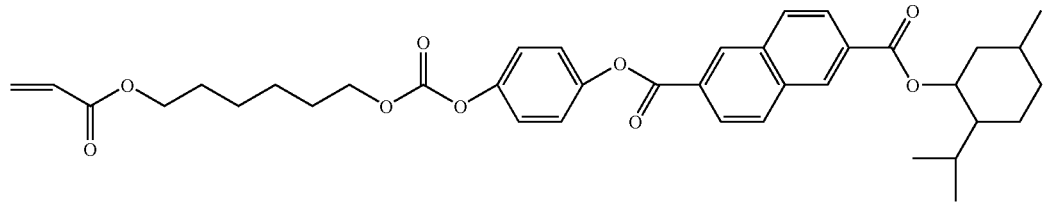
(24)

-continued
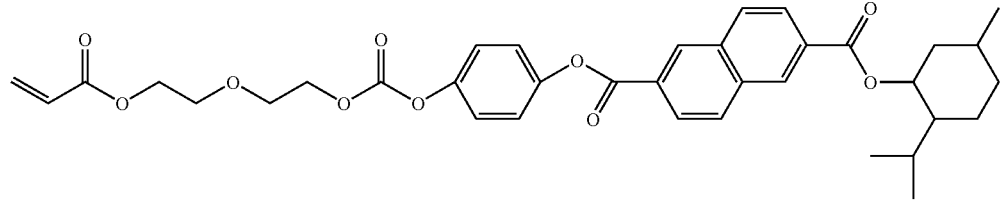
(25)
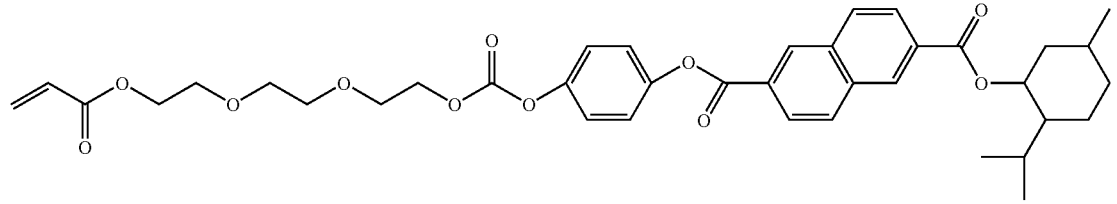
(26)
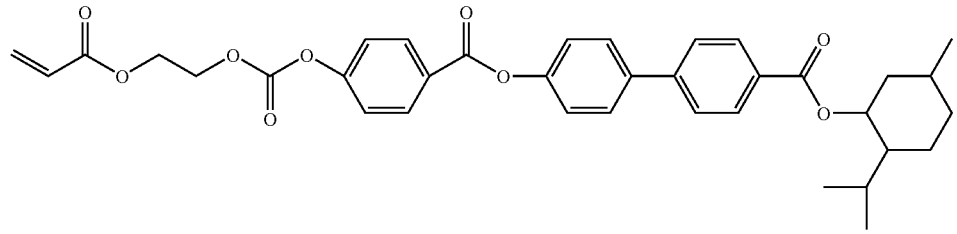
(27)
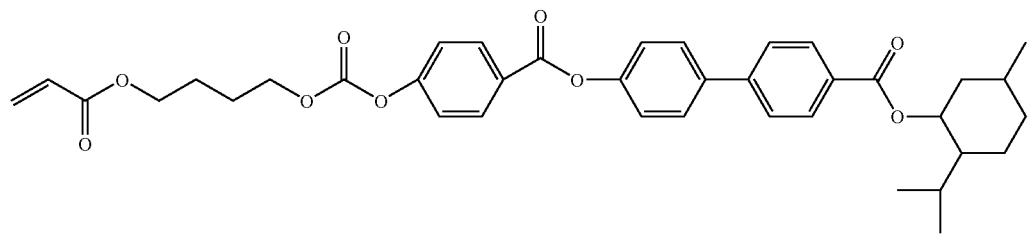
(28)
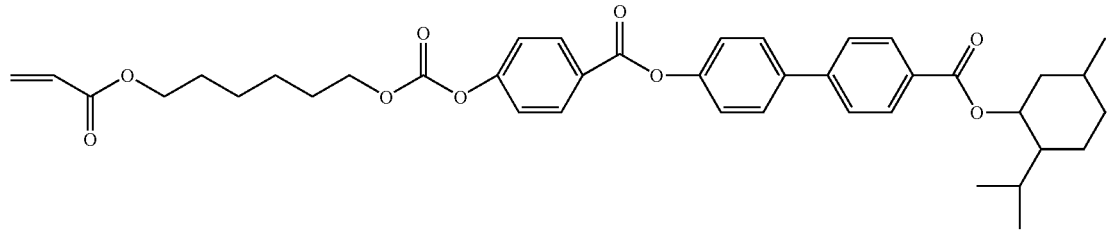
(29)
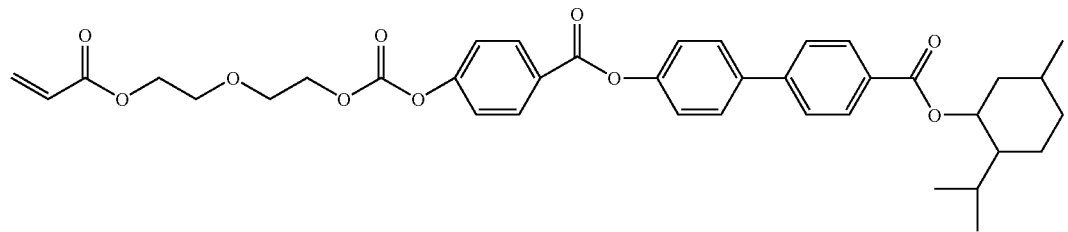
(30)

-continued
(31)
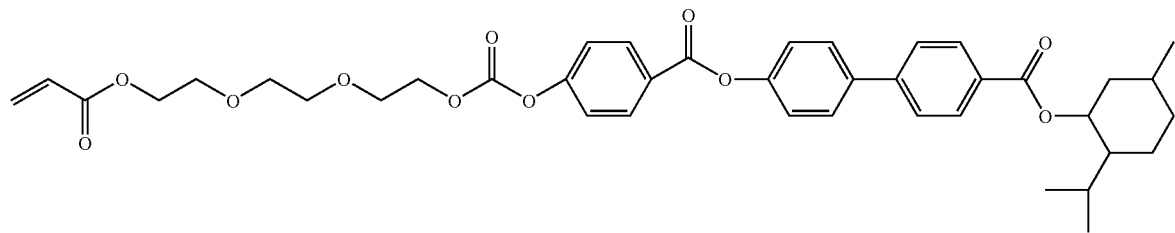
(32)
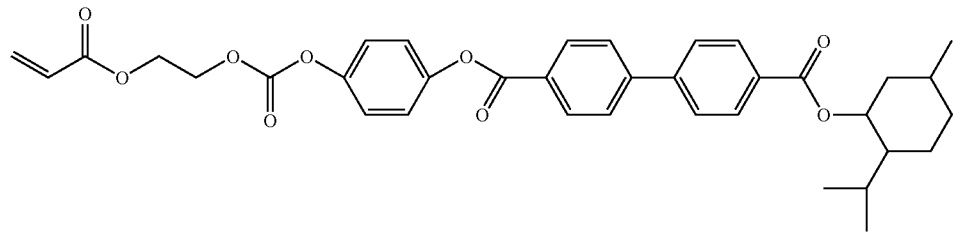
(33)
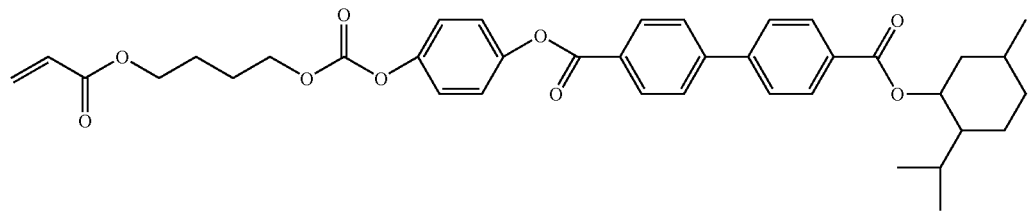
(34)
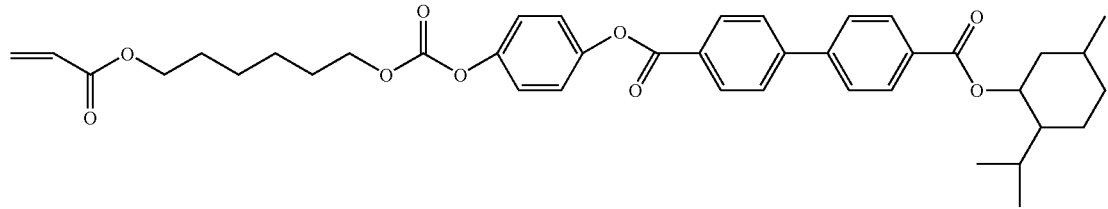
(35)
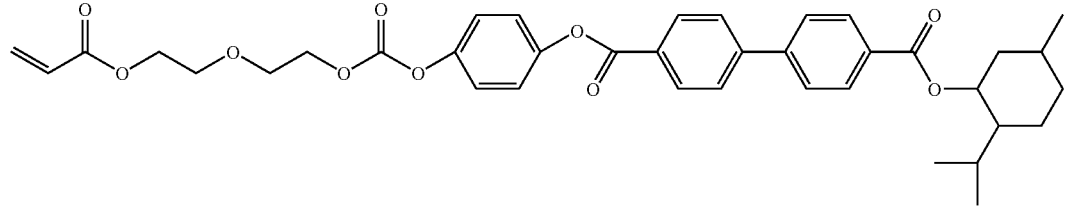
(36)
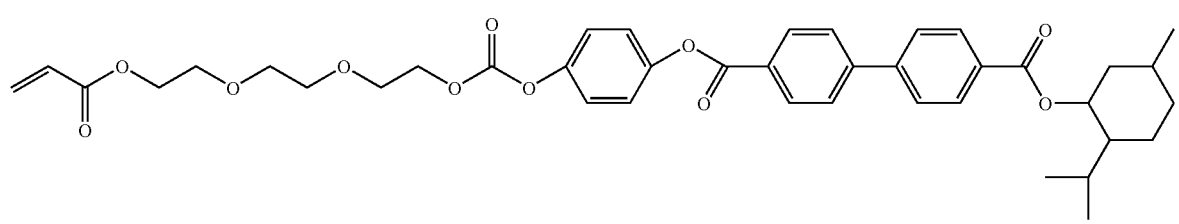

-continued
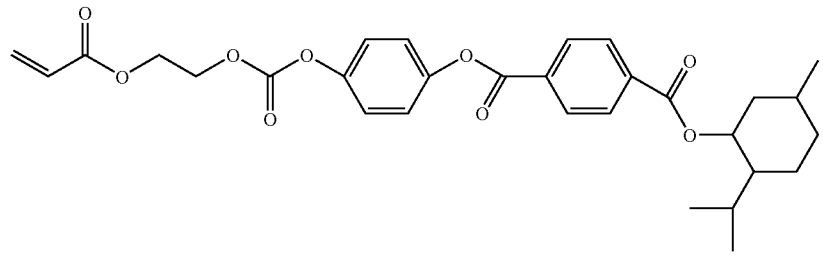
(37)
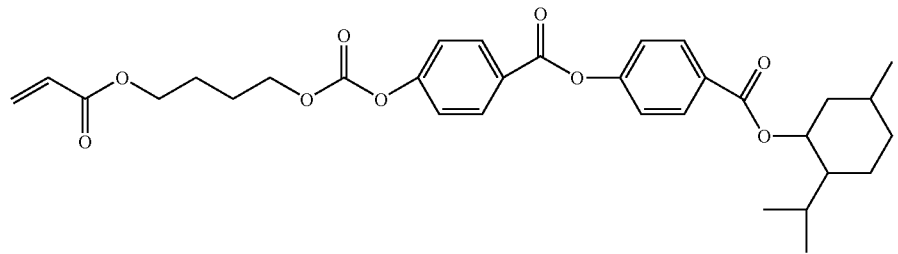
(38)
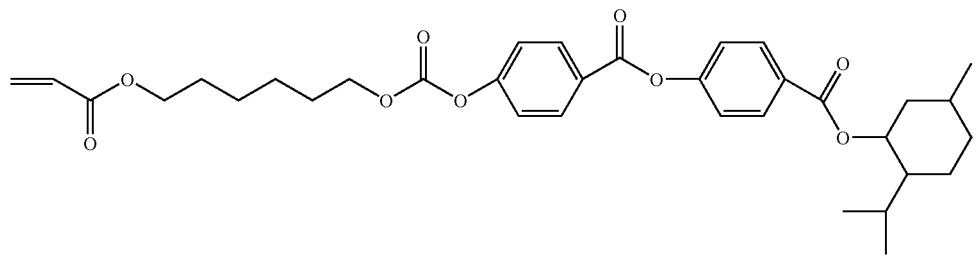
(39)
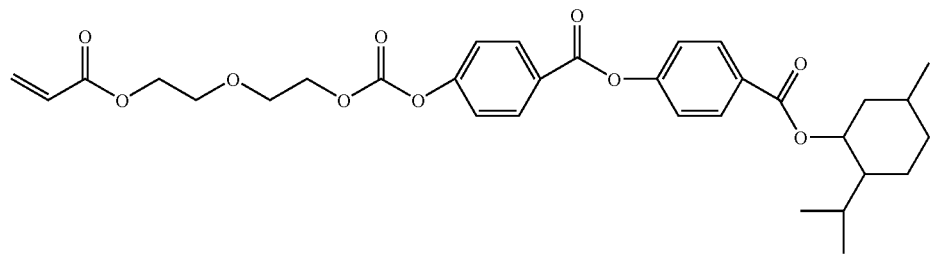
(40)
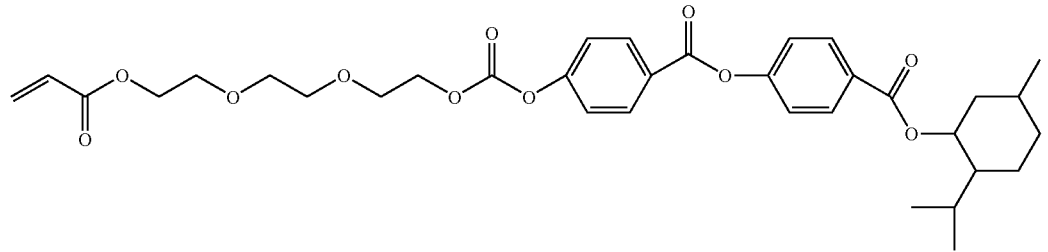
(41)
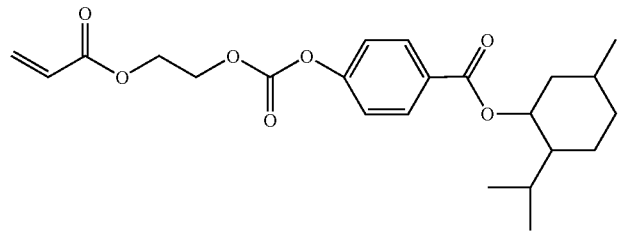
(42)

-continued
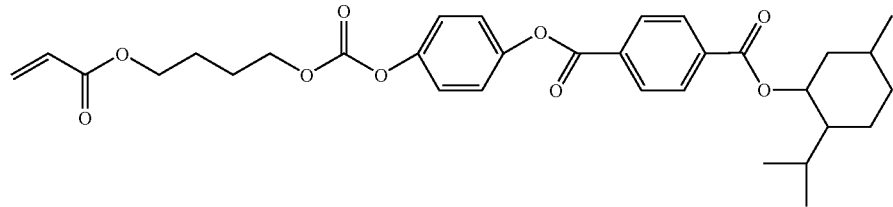 (43)
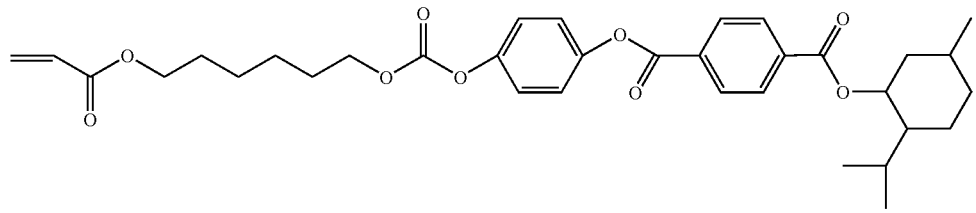 (44)
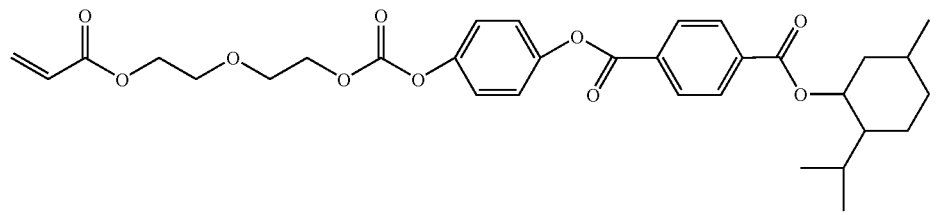 (45)
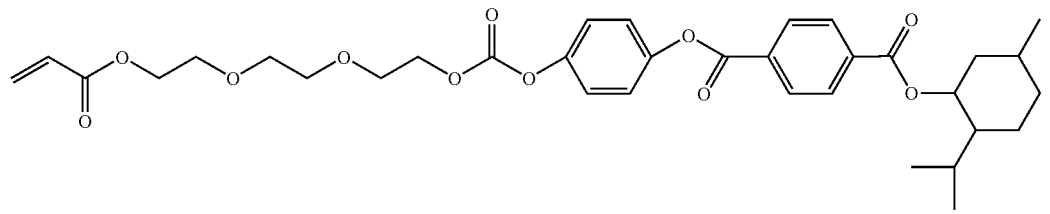 (46)
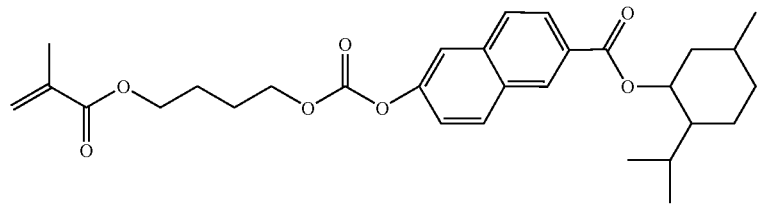 (47)
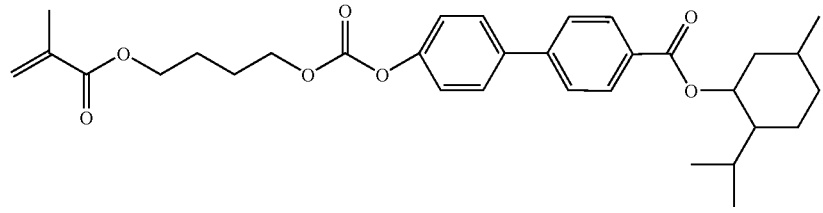 (48)
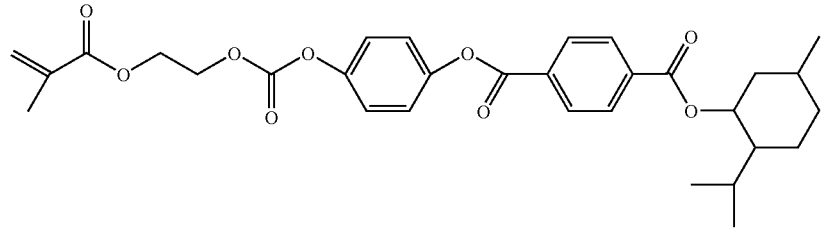 (49)

-continued
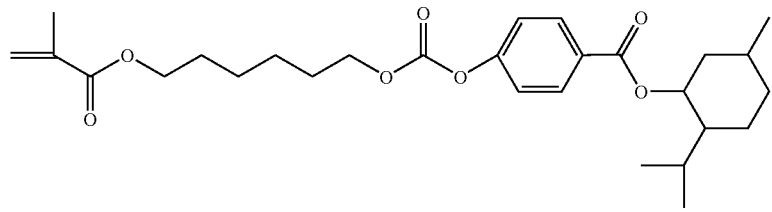
(50)
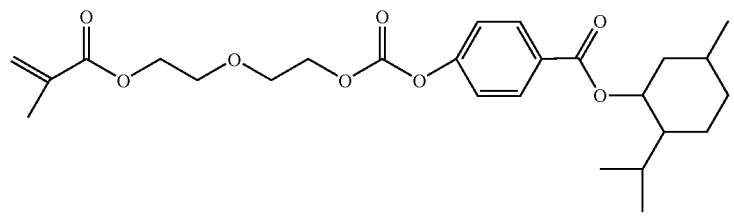
(51)
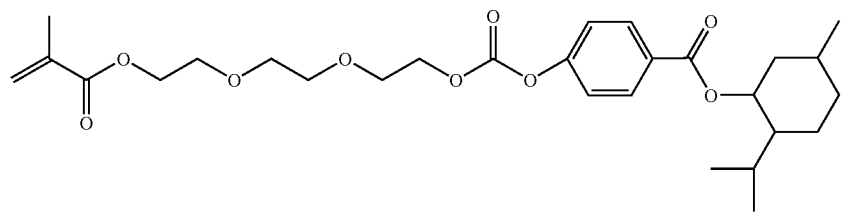
(52)
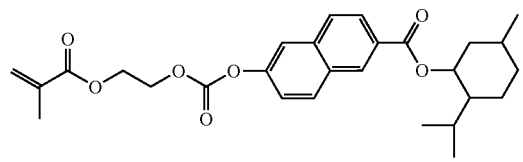
(53)
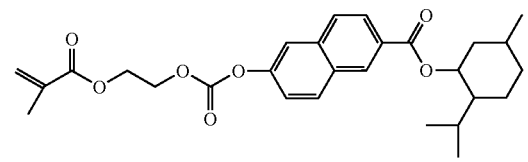
(54)
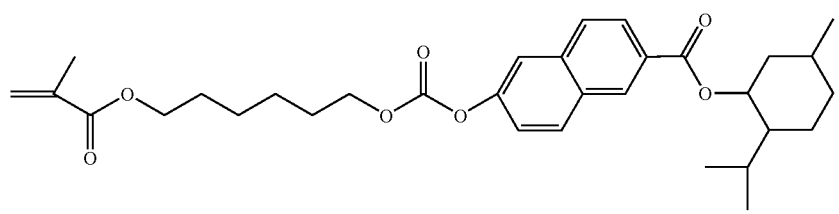
(55)
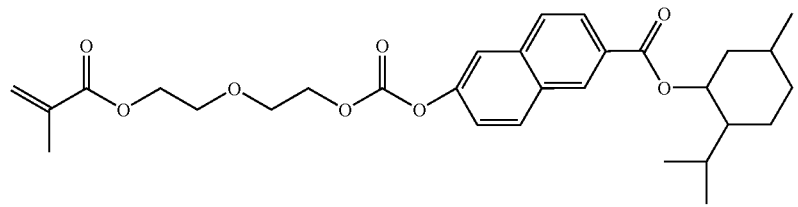
(56)
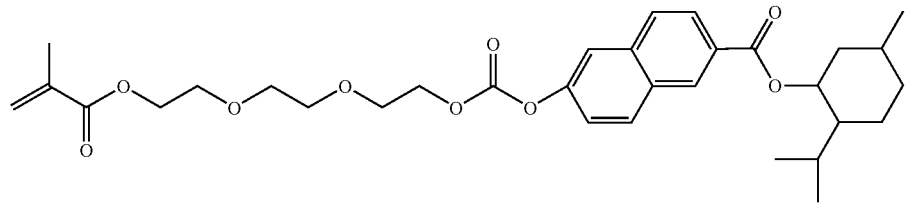
(57)

-continued
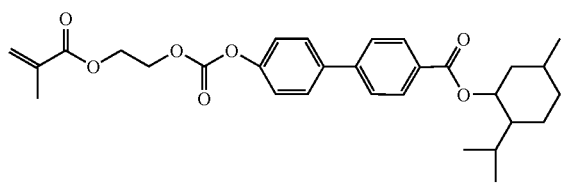
(58)
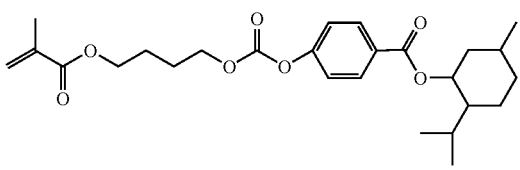
(59)
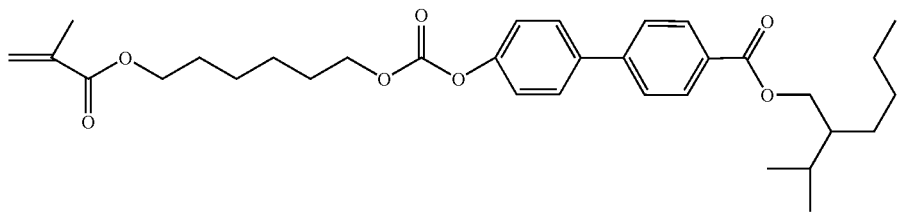
(60)
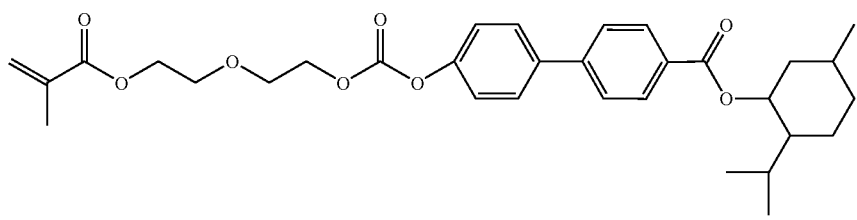
(61)
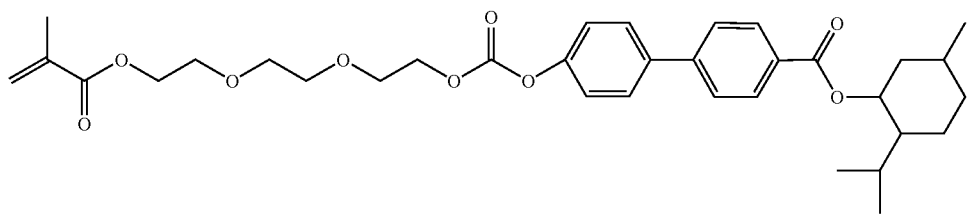
(62)
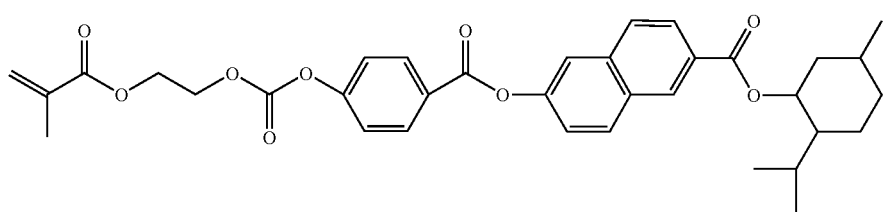
(63)
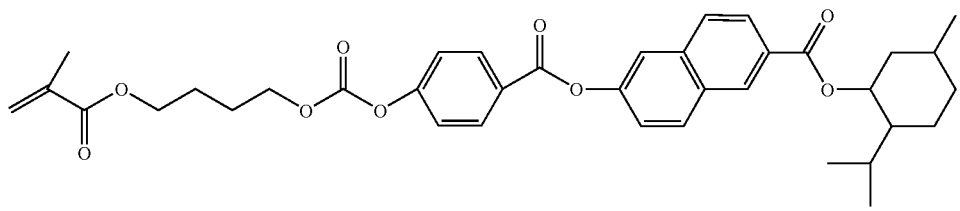
(64)
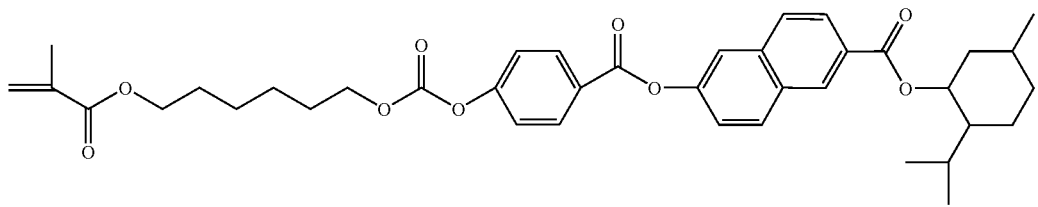
(65)

-continued
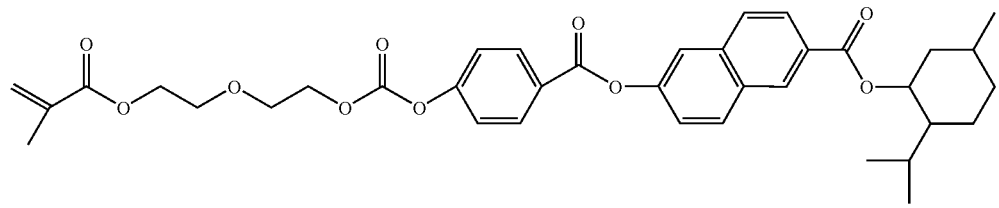
(66)
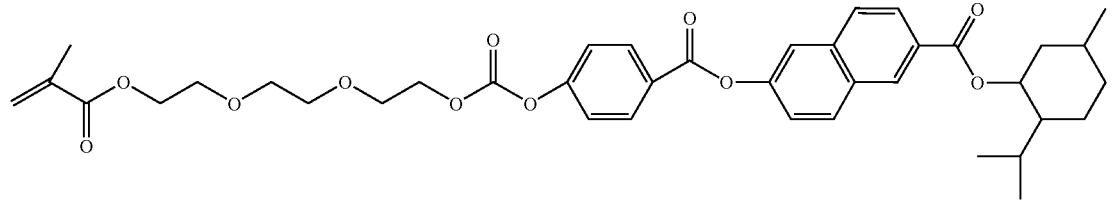
(67)
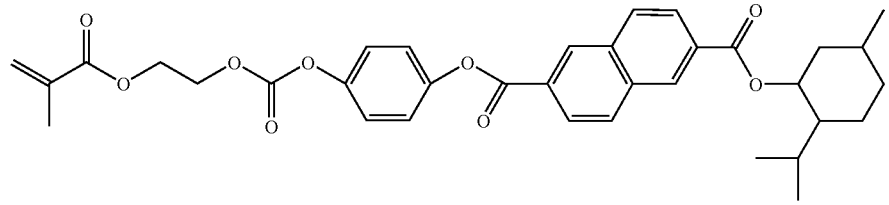
(68)
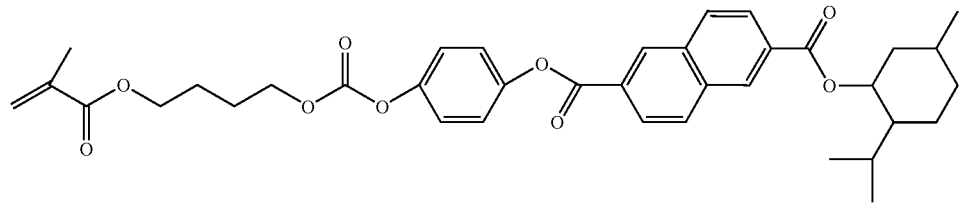
(69)
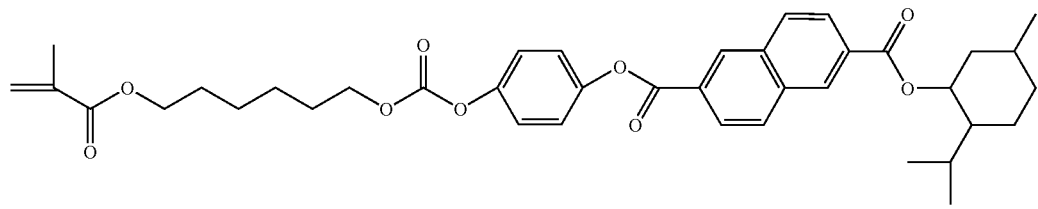
(70)
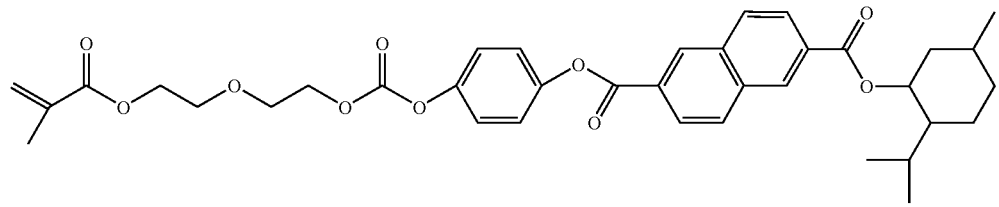
(71)
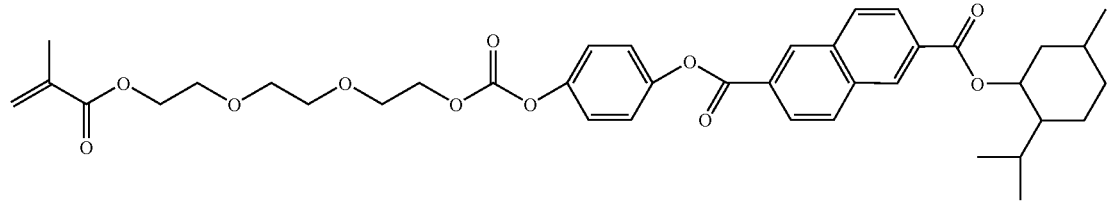
(72)

-continued
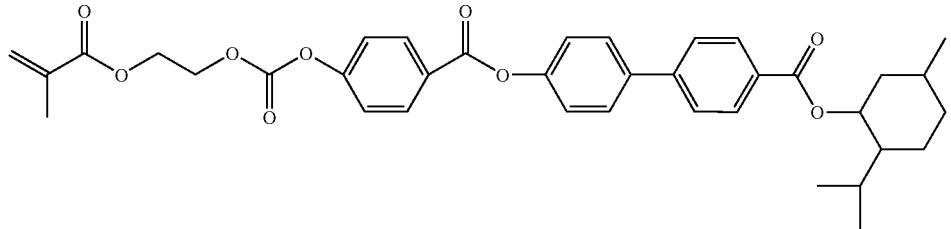
(73)
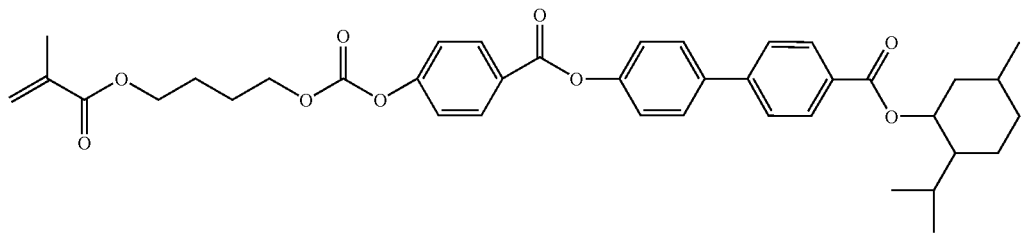
(74)
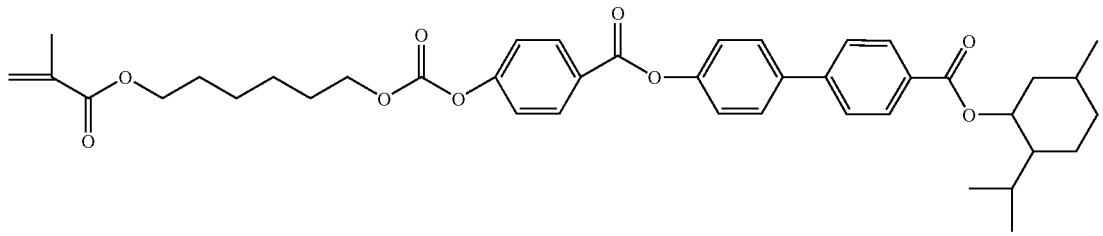
(75)
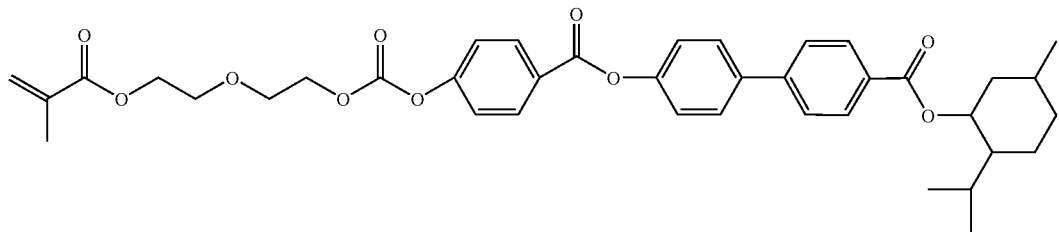
(76)
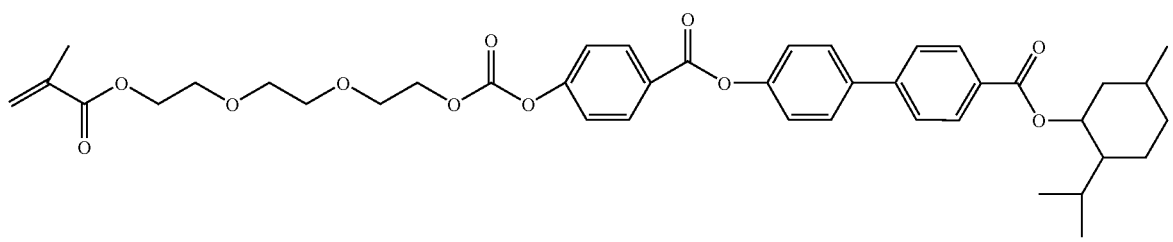
(77)
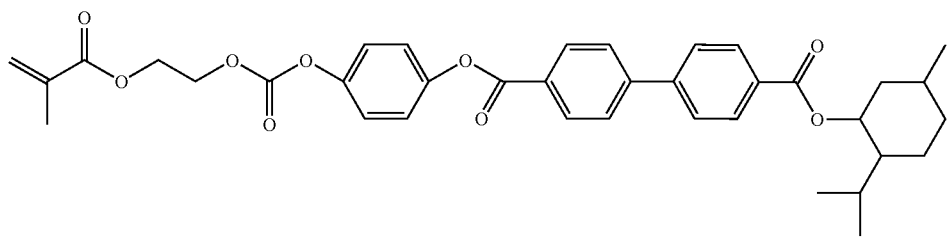
(78)

-continued
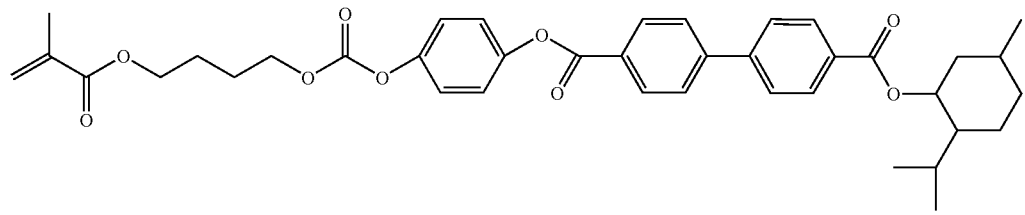
(79)
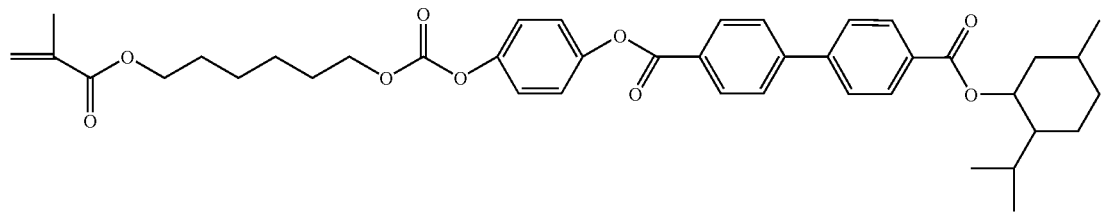
(80)
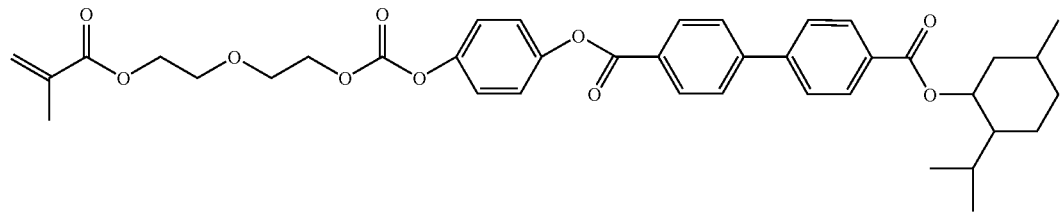
(81)
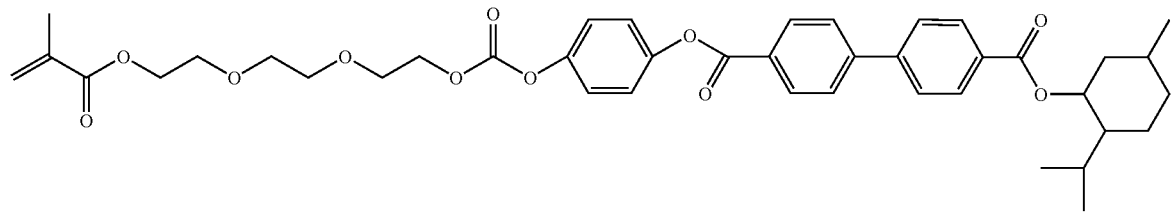
(82)
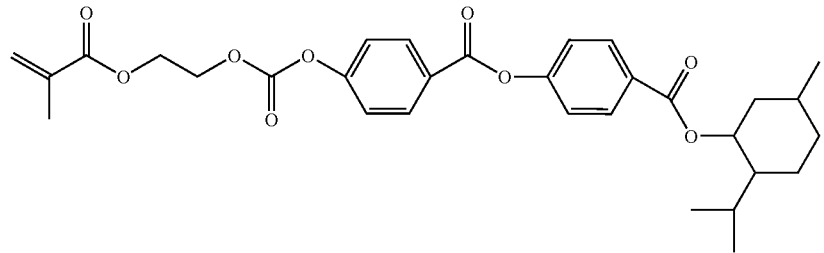
(83)
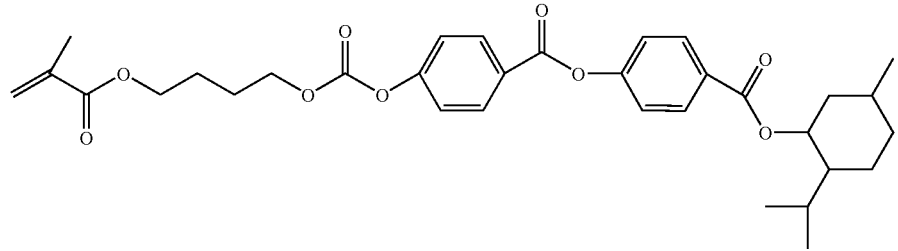
(84)

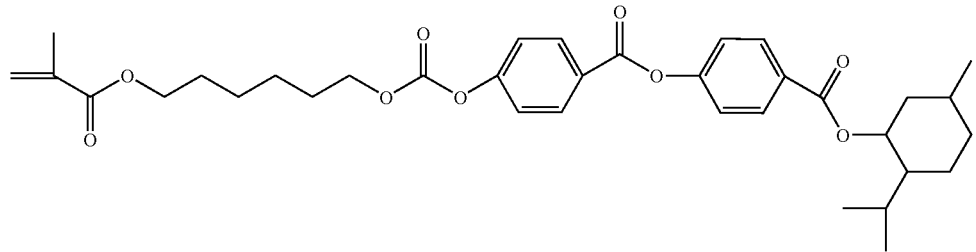
(85)
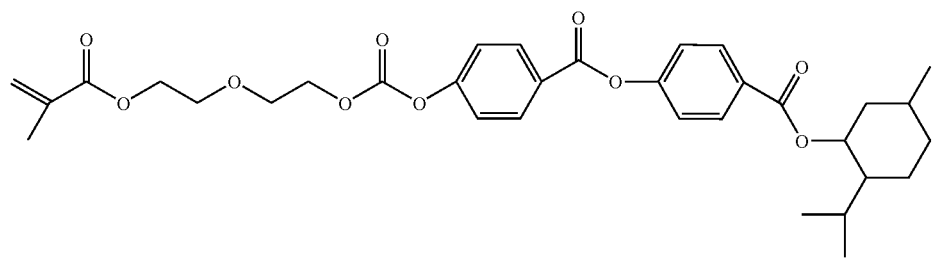
(86)
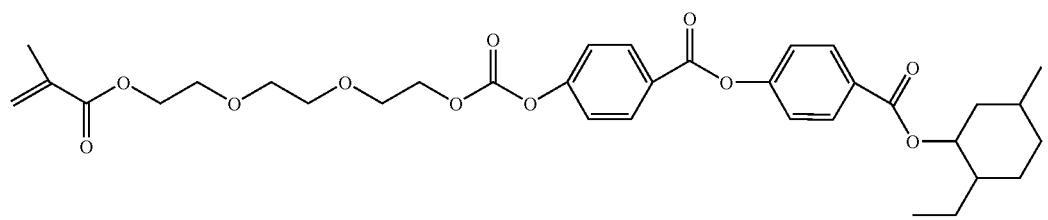
(87)
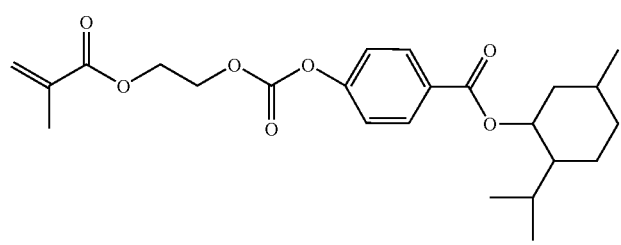
(88)
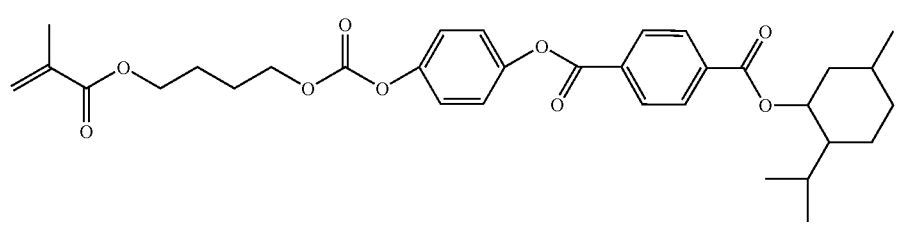
(89)
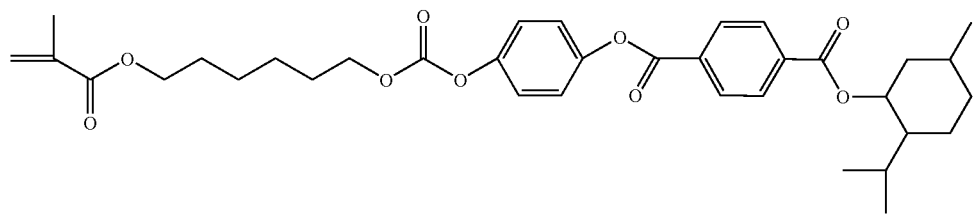
(90)

(91)

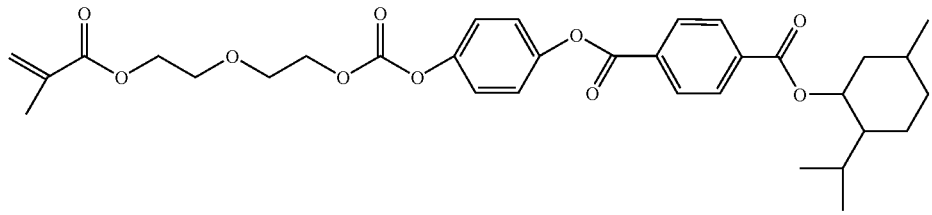

(92)

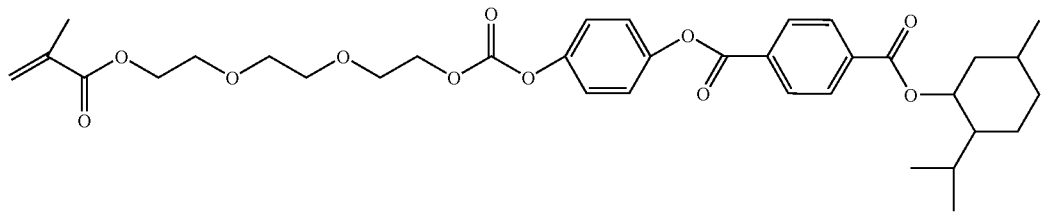

Liquid Crystal Composition

The liquid crystal composition of the invention contains the compound (1) of the invention and a liquid crystal compound. The compound (1) may be used solely or in combination of two or more kinds thereof. Similarly, the liquid crystal compound may be used solely or in combination of two or more kinds thereof. The liquid crystal compound may be a non-polymerizable compound or a polymerizable compound, and at least one thereof is preferably a polymerizable liquid crystal compound.

Examples of the non-polymerizable liquid crystal compound include those disclosed in LiqCryst (LCI Publisher GmbH, Hamburg, Germany) as a database of liquid crystal compounds, and the like.

Examples of the polymerizable liquid crystal compound include compounds represented by formulae (M1a), (M1b), (M1c), (M2a), (M2b) and (M2c).

(M1a)

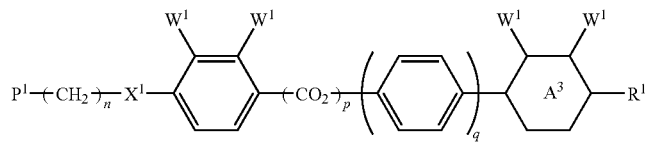

(M1b)

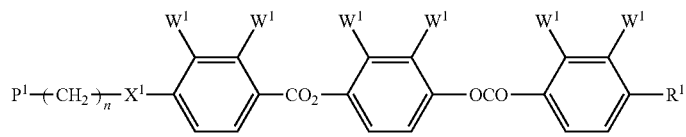

(M1c)

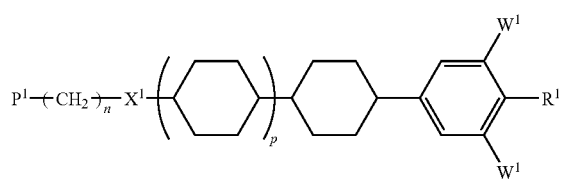

(M2a)

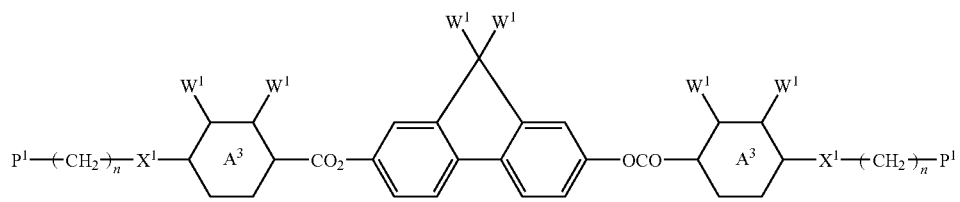

-continued

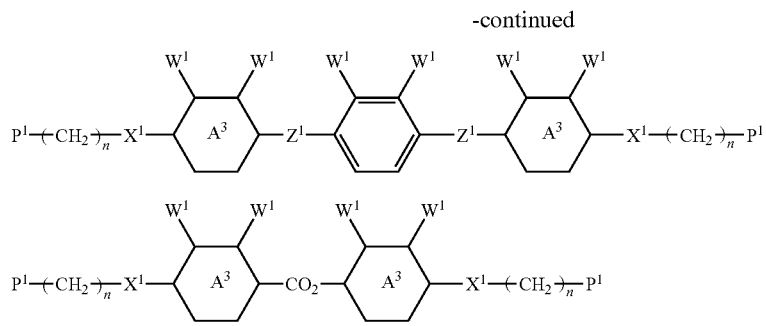
(M2b)

(M2c)

In formulae (M1a) to (M2c), $P^1$ independently represents a group represented by one of formulae (P1) to (P8);

$R^1$ independently represents hydrogen, fluorine, chlorine, —CN or alkyl having from 1 to 20 carbon atoms, wherein in the alkyl, arbitrary —CH$_2$— may be replaced by —O—, —COO— or —OCO—, and arbitrary hydrogen may be replaced by halogen;

ring $A^3$ independently represents 1,4-cyclohexylene or 1,4-phenylene;

$W^1$ independently represents hydrogen, halogen, alkyl having from 1 to 3 carbon atoms or halogenated alkyl having from 1 to 3 carbon atoms;

$X^1$ independently represents a single bond or alkyl having from 1 to 20 carbon atoms, wherein in the alkyl, arbitrary —CH$_2$— may be replaced by —O—, —COO— or —OCO—;

$Z^1$ independently represents —COO—, —OCO—, —CH$_2$CH$_2$—, —CH$_2$O—, —OCH$_2$—, —CH$_2$CH$_2$COO—, —OCOCH$_2$CH$_2$—, —CH=CHCOO— or —OCOCH=CH—;

p and q each independently represent 0 or 1; and n represents an integer of from 0 to 10.

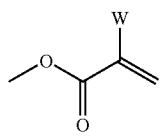
(P1)

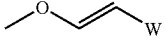
(P2)

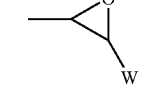
(P3)

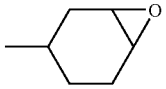
(P4)

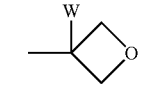
(P5)

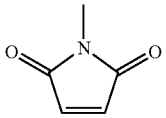
(P6)

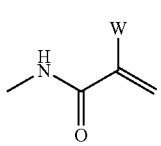
(P7)

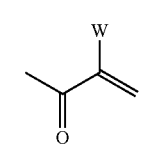
(P8)

In formulae (P1) to (P8), W represents hydrogen, halogen, alkyl having from 1 to 3 carbon atoms or halogenated alkyl having from 1 to 3 carbon atoms.

The liquid crystal composition of the invention has a wide cholesteric liquid crystal phase range around room temperature (about from 10 to 40° C.), and the wavelength range of light reflected by the cholesteric phase can be controlled by changing the compositional ratios of the constitutional components and the temperature, at which the composition is polymerized, whereby a polymer capable of reflecting light having a wavelength corresponding to intended color and purpose can be produced.

In the liquid crystal composition of the invention, the proportion of the compound (1) is preferably from 5 to 40% by weight, more preferably from 5 to 35% by weight, and further preferably from 10 to 30% by weight, based on the total amount of the compound (1) and the liquid crystal compound as 100% by weight. In the case where the proportion of the compound (1) is in the range, a cholesteric liquid crystal material having a specific selected reflection wavelength range and a polymer thereof can be obtained.

The liquid crystal composition of the invention may contain, in addition to the compound (1) and the liquid crystal compound, for example, a non-liquid crystal polymerizable compound, a solvent, a polymerization initiator, a surfactant, an antioxidant, an ultraviolet ray absorbent, a filler and a sensitizer in such an amount that does not impair the advantages of the invention. The liquid crystal composition of the invention may contain an optically active compound other than the compound (1) for optimizing the characteristics of the composition.

Polymer

The polymer of the invention can be obtained by polymerizing the liquid crystal composition of the invention. In the polymer of the invention, the cholesteric liquid crystal phase (helical structure) of the composition is fixed through polymerization, and the polymer reflects light having a wavelength corresponding to intended color and purpose. The polymerization reaction of the composition may be thermal polymerization under heating, photopolymerization under irradiation of light, or a combination thereof.

Preferred examples of the light used for the photopolymerization include an ultraviolet ray, a visible ray and an infrared ray, and an electron beam and an electromagnetic ray, such as an X-ray, may be used. In general, an ultraviolet ray or a visible ray is used. The wavelength range thereof is preferably from 150 to 500 nm, more preferably from 250 to 450 nm, and particularly preferably from 300 to 400 nm. Examples of a light source therefor include a low-pressure mercury lamp (such as a bactericidal lamp, a fluorescent chemical lamp and a black light lamp), a high-pressure discharge lamp (such as a high-pressure mercury lamp and a metal halide lamp), and a short arc discharge lamp (such as a super high-pressure mercury lamp, a xenon lamp and a mercury xenon lamp), and among these, a super high-pressure mercury lamp is preferably used.

The composition may be irradiated with the light as it is emitted from the light source, or may be irradiated with light having a specific wavelength (or a specific wavelength range) selected with a filter. The irradiation energy density thereof is preferably from 2 to 5,000 $mJ/cm^2$, more preferably from 10 to 3,000 $mJ/cm^2$, and particularly preferably from 100 to 2,000 $mJ/cm^2$. The illuminance thereof is preferably from 0.1 to 5,000 $mW/cm^2$, and more preferably from 1 to 2,000 $mW/cm^2$.

The polymer is not particularly limited in shape, and may be in the form of a membrane (film) or a plate, and the polymer may be molded. The film can be obtained, for example, by coating the liquid crystal composition of the invention on a substrate, followed by polymerization.

Usage

Examples of usage of the liquid crystal composition and the polymer of the invention include a general coloring material, such as a liquid crystal pigment, a paint, a spray ink and a printing ink, and also include a cosmetic product, an anti-counterfeit printed matter, an ornamental article and an optical film.

EXAMPLES

The invention will be described in more detail with reference to examples below, but the invention is not construed as being limited to the examples.

Example 1

First Step

6-Acetoxy-2-naphthalene carboxylic acid (4.6 g), L-menthol (3.2 g), DCC (5.0 g), DMAP (0.24 g) and methylene chloride (50 mL) were mixed and stirred at room temperature for 1 hour. Crystals thus deposited were removed by filtration. Water (50 mL) was added to the filtrate, and the methylene chloride solution was separated from the mixture. The solution was then sufficiently washed with a hydrochloric acid solution, a saturated sodium hydrogen carbonate solution and water in this order, followed by drying over anhydrous magnesium sulfate. The solvent was distilled off from the organic layer, and the resulting residue was purified by column chromatography (stationary phase: silica gel, eluent: mixed solvent of toluene and ethyl acetate (10/1 by volume)) to provide a brownish yellow solid (4.4 g).

Second Step

Methanol (20 mL) was added to the resulting solid, and 30% aqueous ammonia (2 mL) was added dropwise thereto at room temperature. After stirring at room temperature for 2 hours, 6N hydrochloric acid (30 mL) was added to neutralize the reaction solution, which was then extracted with ethyl acetate (200 mL), followed by drying over anhydrous magnesium sulfate. The solvent was distilled off from the organic layer.

Third Step

THF (30 mL), triethylamine (3 mL) and 4-acryloyloxybutyl chloroformate (3.0 g) were mixed with the resulting residue, followed by stirring at room temperature for 8 hours. After completing the reaction, THF was partially distilled off, and ethyl acetate (100 mL) and water (50 mL) were added, followed by separating the ethyl acetate layer. The ethyl acetate layer was sufficiently washed with a hydrochloric acid solution, a saturated sodium hydrogen carbonate solution and water in this order, followed by drying over anhydrous magnesium sulfate. The solvent was distilled off from the organic layer, and the resulting residue was purified by column chromatography (stationary phase: silica gel, eluent: mixed solvent of toluene and ethyl acetate (10/1 by volume)) to provide a target brownish yellow solid (3.5 g). The NMR analysis values of the resulting compound is shown below, and the structure thereof is shown in Table 1.

$^1$H-NMR (CDCl$_3$): δ (ppm); 0.81-0.95 (m, 9H), 1.11-1.60 (m, 5H), 1.77 (m, 2H), 1.86 (m, 4H), 1.97 (m, 1H), 2.15 (m, 1H), 4.23 (t, 2H), 4.32 (t, 2H), 5.00 (m, 1H), 5.83 (dd, 2H), 6.14 (dd, 2H), 6.41 (dd, 2H), 7.38 (d, 1H), 7.70 (d, 1H), 7.84 (d, 1H), 7.98 (d, 1H), 8.08 (d, 1H), 8.60 (s, 1H)

Example 2

A target compound (2.5 g) was obtained in the same manner as in Example 1 except that 4'-acetoxybiphenyl-4-carboxylic acid was used instead of 6-acetoxy-2-naphthalene carboxylic acid. The NMR analysis values of the resulting compound is shown below, and the structure thereof is shown in Table 1.

$^1$H-NMR (CDCl$_3$): δ (ppm); 0.81-0.95 (m, 9H), 1.11-1.60 (m, 5H), 1.77 (m, 2H), 1.86 (m, 4H), 1.97 (m, 1H), 2.15 (m, 1H), 4.23 (t, 2H), 4.32 (t, 2H), 5.00 (m, 1H), 5.83 (dd, 2H), 6.14 (dd, 2H), 6.41 (dd, 2H), 7.27 (d, 2H), 7.61 (d, 2H), 7.63 (d, 2H), 8.0 (d, 2H)

Example 3

A target compound (2.6 g) was obtained in the same manner as in Example 1 except that 4-acetoxybenzoic acid (3.6 g) was used instead of 6-acetoxy-2-naphthalene carboxylic acid (4.6 g), 4-methacryloyloxyethyl chloroformate (2.5 g) was used instead of 4-acryloyloxybutyl chloroformate (3.0 g) and the amount of L-menthol used was changed to 3.1 g. The structure of the resulting compound is shown below.

$^1$H-NMR (CDCl$_3$): δ (ppm); 0.78-2.1 (m, 22H), 4.45-4.54 (m, 4H), 4.90-4.95 (m, 1H), 5.6-6.18 (m, 2H), 7.24-8.10 (m, 4H)

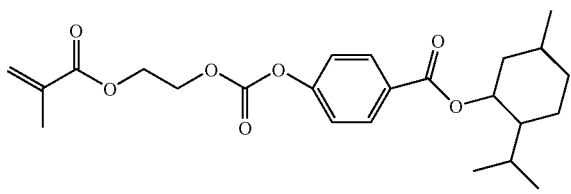

Measurement of Helical Pitch and HTP

The helical pitch was measured in the following manner.

The compound (about 0.01 g) obtained in Example was placed in a glass sample tube, to which the following composition (M-1) was added and mixed to make a content of the compound obtained in Example of about 1% by weight. Subsequently, the mixture was dissolved by heating to a completely isotropic liquid, and then allowed to stand for cooling. A part of the composition thus obtained was charged in a wedge cell, and the pitch was measured at 25° C. by the Cano wedge cell method (Oyo Butsuri (Applied Chemistry), No. 43, p. 125 (1974)). The HTP was calculated based on the pitch thus obtained by the expression $HTP=p^{-1} \times c^{-1}$, wherein c represents the percentage by weight of the sample compound, and p represents the pitch (μm). The helical pitches and the HTP of the compounds obtained in Examples 1 and 2 are shown in Table 1.

TABLE 1

(M-1)

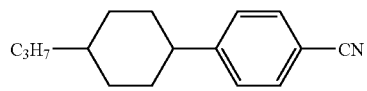

24%

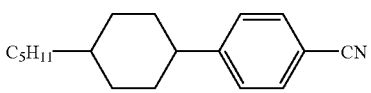

36%

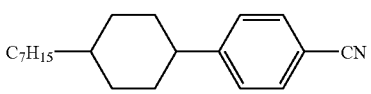

25%

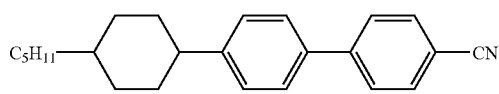

15%

| | | c: concentration (% by weight) | p: pitch (μM) | HTP |
|---|---|---|---|---|
| Example 1 | 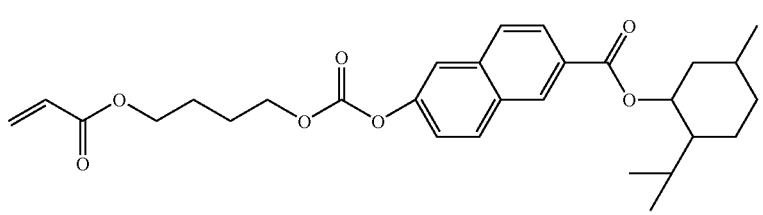 | 1% | 5 | 20 |
| Example 2 | 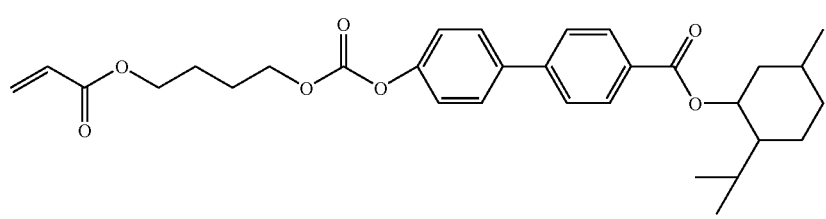 | 1% | 7.7 | 13 |

TABLE 1-continued (M-1)

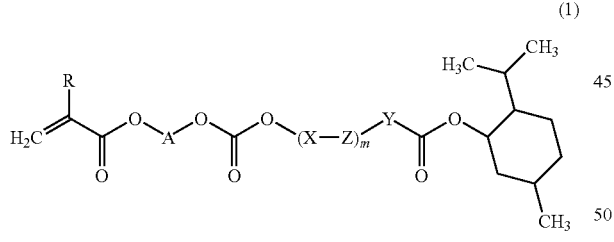

24%

36%

25%

15%

| | c: concentration (% by weight) | p: pitch (μM) | HTP |
|---|---|---|---|
| Example 3 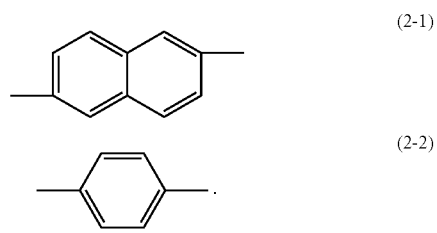 | 1% | 12 | 8 |

What is claimed is:

1. A compound represented by formula (1):

(1)

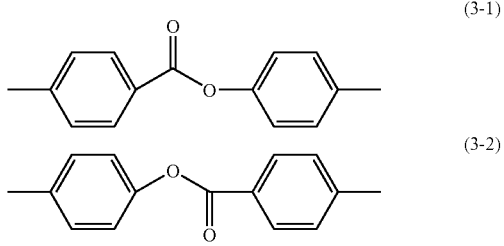

wherein

R represents hydrogen or methyl;

A represents alkylene having from 1 to 12 carbon atoms, wherein in the alkylene, arbitrary —CH$_2$— may be replaced by —O—, —S—, —CH=CH—, —CO—, —COO— or —OCO—;

X and Y each independently represent an aromatic ring or a cyclohexane ring, wherein in the rings, arbitrary hydrogen may be replaced by alkyl having from 1 to 3 carbon atoms;

Z independently represents a single bond, —O—, —S—, —COO—, —OCO—, —CON(R$^1$)— or —N(R$^1$)CO—, wherein R$^1$ represents hydrogen or methyl; and m represents an integer of from 0 to 3.

2. The compound according to claim 1, wherein in formula (1), —(X—Z)$_m$—Y— is a structure represented by formula (2-1) or (2-2):

(2-1)

(2-2)

3. The compound according to claim 1, wherein in formula (1), —(X—Z)$_m$—Y— is a structure represented by one of formulae (3-1) to (3-7):

(3-1)

(3-2)

-continued

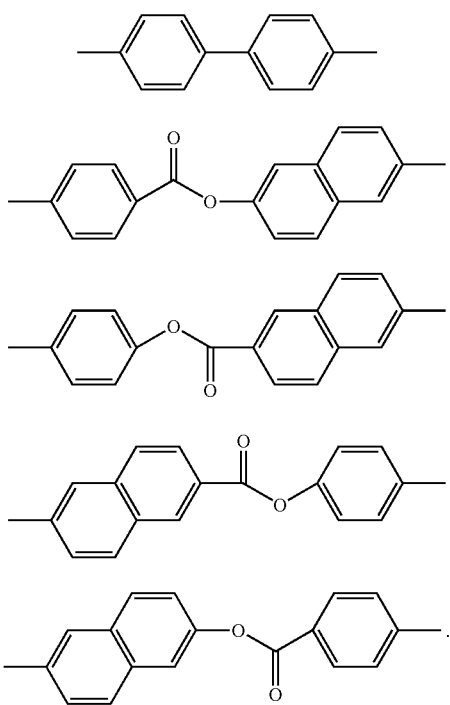

(3-3)
(3-4)
(3-5)
(3-6)
(3-7)

4. The compound according to claim 1, wherein in formula (1), —(X—Z)$_m$—Y— is a structure represented by one of formulae (4-1) to (4-4):

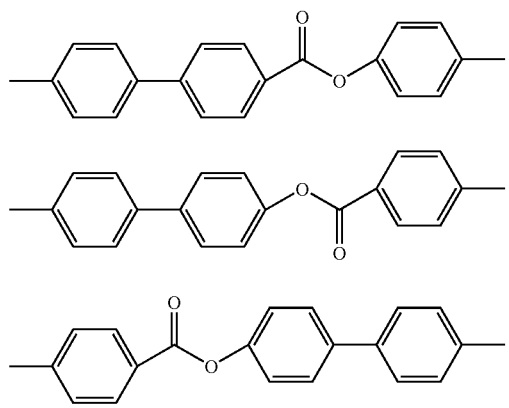

(4-1)
(4-2)
(4-3)

-continued

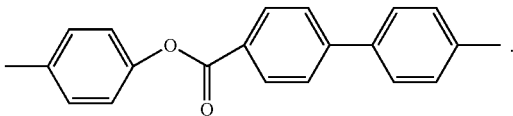

(4-4)

5. The compound according to claim 1, wherein in formula (1), A represents —CH$_2$CH$_2$CH$_2$CH$_2$— or —CH$_2$CH$_2$—.

6. The compound according to claim 1, wherein in formula (1), A represents —CH$_2$CH$_2$OCH$_2$CH$_2$— or —CH$_2$CH$_2$—O—CH$_2$CH$_2$—O—CH$_2$CH$_2$—.

7. A liquid crystal composition comprising the compound according to claim 1 and a liquid crystal compound.

8. A liquid crystal composition comprising the compound according to claim 2 and a liquid crystal compound.

9. A liquid crystal composition comprising the compound according to claim 3 and a liquid crystal compound.

10. A liquid crystal composition comprising the compound according to claim 4 and a liquid crystal compound.

11. A liquid crystal composition comprising the compound according to claim 5 and a liquid crystal compound.

12. A liquid crystal composition comprising the compound according to claim 6 and a liquid crystal compound.

13. The liquid crystal composition according to claim 7, wherein the liquid crystal composition comprises at least one polymerizable liquid crystal compound as the liquid crystal compound.

14. A polymer comprising the liquid crystal composition according to claim 13 having been polymerized.

15. The polymer according to claim 14, wherein the polymer exhibits a cholesteric liquid crystal phase.

16. A method for using the liquid crystal composition according to claim 7 as a liquid crystal pigment, a paint, a spray ink, a printing ink, a cosmetic product, an anticounterfeit printed matter, an ornamental article and an optical film.

17. A method for using the liquid crystal composition according to claim 13 as a liquid crystal pigment, a paint, a spray ink, a printing ink, a cosmetic product, an anticounterfeit printed matter, an ornamental article and an optical film.

18. A method for using the polymer according to claim 14 as a liquid crystal pigment, a paint, a spray ink, a printing ink, a cosmetic product, an anticounterfeit printed matter, an ornamental article and an optical film.

19. A method for using the polymer according to claim 15 as a liquid crystal pigment, a paint, a spray ink, a printing ink, a cosmetic product, an anticounterfeit printed matter, an ornamental article and an optical film.

* * * * *